US011182899B2

(12) United States Patent
Raciti et al.

(10) Patent No.: US 11,182,899 B2
(45) Date of Patent: Nov. 23, 2021

(54) SYSTEMS AND METHODS FOR PROCESSING ELECTRONIC IMAGES TO DETECT CONTAMINATION

(71) Applicant: PAIGE.AI, Inc., New York, NY (US)

(72) Inventors: Patricia Raciti, New York, NY (US); Christopher Kanan, Rochester, NY (US); Thomas Fuchs, New York, NY (US); Leo Grady, Darien, CT (US)

(73) Assignee: Paige.AI, Inc., New York, NY (US)

( * ) Notice: Subject to any disclaimer, the term of this patent is extended or adjusted under 35 U.S.C. 154(b) by 0 days.

(21) Appl. No.: 17/119,767

(22) Filed: Dec. 11, 2020

(65) Prior Publication Data

US 2021/0192730 A1 Jun. 24, 2021

Related U.S. Application Data

(63) Continuation of application No. 17/107,433, filed on Nov. 30, 2020.

(Continued)

(51) Int. Cl.
*G06T 7/00* (2017.01)
*G06T 7/194* (2017.01)
(Continued)

(52) U.S. Cl.
CPC .......... *G06T 7/0012* (2013.01); *G06K 9/4671* (2013.01); *G06T 7/11* (2017.01);
(Continued)

(58) Field of Classification Search
CPC ......... G06T 7/0012; G06T 7/194; G06T 7/11; G06T 2207/20084; G06T 2207/30024;
(Continued)

(56) References Cited

U.S. PATENT DOCUMENTS

2008/0226148 A1\* 9/2008 Gu ........................ G06T 7/0002
382/128
2016/0034809 A1\* 2/2016 Trenholm ................. G06F 8/35
706/20

(Continued)

OTHER PUBLICATIONS

Campanella, Gabriele, et al. "Clinical-grade computational pathology using weakly supervised deep learning on whole slide images" Nature Medicine, 25 8 (2019): 1301-1309.

(Continued)

*Primary Examiner* — Jon Chang
(74) *Attorney, Agent, or Firm* — Bookoff McAndrews, PLLC

(57) ABSTRACT

Systems and methods are disclosed for receiving one or more digital images associated with a tissue specimen, detecting one or more image regions from a background of the one or more digital images, determining a prediction, using a machine learning system, of whether at least one first image region of the one or more image regions comprises at least one external contaminant, the machine learning system having been trained using a plurality of training images to predict a presence of external contaminants and/or a location of any external contaminants present in the tissue specimen, and determining, based on the prediction of whether a first image region comprises an external contaminant, whether to process the image region using an processing algorithm.

19 Claims, 13 Drawing Sheets

Related U.S. Application Data

(60) Provisional application No. 62/951,504, filed on Dec. 20, 2019.

(51) Int. Cl.
  *G06T 7/11* (2017.01)
  *G06K 9/46* (2006.01)
  *G06K 9/62* (2006.01)

(52) U.S. Cl.
  CPC .......... *G06T 7/194* (2017.01); *G06K 2209/05* (2013.01); *G06T 2207/10056* (2013.01); *G06T 2207/20081* (2013.01); *G06T 2207/20084* (2013.01); *G06T 2207/30024* (2013.01)

(58) Field of Classification Search
  CPC . G06T 2207/20081; G06T 2207/10024; G06T 2207/10056; G06K 9/4671; G06K 2209/05; G06K 9/6277; G06K 9/6262
  See application file for complete search history.

(56) References Cited

U.S. PATENT DOCUMENTS

| | | | |
|---|---|---|---|
| 2017/0193325 A1* | 7/2017 | Duong | G06K 9/00268 |
| 2019/0295252 A1 | 9/2019 | Fuchs et al. | |
| 2020/0124868 A1* | 4/2020 | Carrascal De Las Heras | G16H 10/40 |

OTHER PUBLICATIONS

Komura, Daisuke, et al. "Machine learning methods for histopathological image analysis." Computational and Structural Biotechnology Journal 16 (2018): 34-42.

Xia, Yan, et al. "Learning discriminative reconstructions for unsupervised outlier removal." Proceedings of the IEEE International Conference on Computer Vision. 2015.

International Search Report and Written Opinion dated Mar. 10, 2021 in counterpart International Patent Application No. PCT/US2020/063399 (16 pages, in English).

* cited by examiner

ND METHODS FOR
SYSTEMS AND METHODS FOR PROCESSING ELECTRONIC IMAGES TO DETECT CONTAMINATION

CROSS-REFERENCE TO RELATED APPLICATION(S)

This application claims priority to U.S. application Ser. No. 17/107,433, filed on Nov. 30, 2020, which claims priority to U.S. Provisional Application No. 62/951,504 filed Dec. 20, 2019, the entire disclosures of which are hereby incorporated herein by reference in their entireties.

FIELD OF THE DISCLOSURE

Various embodiments of the present disclosure pertain generally to pathology slide preparation and related image processing methods. More specifically, particular embodiments of the present disclosure relate to systems and methods for identifying or detecting tissue specimens contaminated with external contaminants. The present disclosure further provides systems and methods for automatically detecting tissue contamination based on processing images of tissue specimens.

BACKGROUND

In histopathology, errors in specimen preparation and mishandling of data associated with a slide can occur in multiple ways. This can lead to an incorrect diagnosis and improper analysis of a patient's case, resulting in unnecessary or incorrect treatment. One of the most common errors in histopathology laboratories is contamination of slides with foreign tissue. For example, a past study found that 3% of slides had contamination from foreign tissues. After a tissue specimen (e.g., a biopsy) is taken from a human or animal patient, laboratories typically process the tissue in a shared space on the same equipment as other tissue specimens. Because of this, sometimes a piece of patient A's tissue can contaminate patient B's slide and/or block. In pathology, this kind of extrinsic tissue contamination is known as a "floater." Floaters, especially when they harbor cancer, can lead to an incorrect interpretation of the findings of a tissue specimen, which can result in incorrect treatment.

Using artificial intelligence (AI) with digital pathology, the system and methods in the following disclosure may automatically detect possible floaters. This information may be used to help prevent misdiagnosis by both pathologists and AI systems. A desire exists for a way to ensure that pathology slides have not been contaminated by floaters. Disclosed embodiments ensure that slides have not been contaminated by an external floater, ensuring proper diagnosis and treatment of the specimen. The disclosed embodiments may prevent incorrect interpretation of the findings on a tissue specimen, or incorrect treatment that may result from an incorrect interpretation.

The foregoing general description and the following detailed description are exemplary and explanatory only and are not restrictive of the disclosure. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the present disclosure, systems and methods are disclosed for using AI to detect contamination in pathology specimen preparations.

A computer-implemented method for processing an electronic image corresponding to a tissue specimen includes: receiving one or more digital images associated with a tissue specimen; detecting one or more image regions from a background of the one or more digital images; determining a prediction, using a machine learning system, of whether at least one first image region of the one or more image regions comprises at least one external contaminant, the machine learning system having been trained using a plurality of training images to predict a presence of external contaminants and/or a location of any external contaminants present in the tissue specimen; and determining, based on the prediction of whether a first image region comprises an external contaminant, whether to process the image region using a processing algorithm.

In accordance with another embodiment, a system for processing an electronic image corresponding to a tissue specimen includes: at least one memory storing instructions; and at least one processor configured to execute the instructions to perform operations including: receiving one or more digital images associated with a tissue specimen; detecting one or more image regions from a background of the one or more digital images; determining a prediction, using a machine learning system, of whether at least one first image region of the one or more image regions comprises at least one external contaminant, the machine learning system having been trained using a plurality of training images to predict a presence of external contaminants and/or a location of any external contaminants present in the tissue specimen; and determining, based on the prediction of whether a first image region comprises an external contaminant, whether to process the image region using a processing algorithm.

In accordance with another embodiment, at least one non-transitory computer readable medium for processing an electronic image corresponding to a tissue specimen, the at least one non-transitory computer readable medium storing instructions which, when executed by one or more processors, cause the one or more processors to perform operations including: receiving one or more digital images associated with a tissue specimen; detecting one or more image regions from a background of the one or more digital images; determining a prediction, using a machine learning system, of whether at least one first image region of the one or more image regions comprises at least one external contaminant, the machine learning system having been trained using a plurality of training images to predict a presence of external contaminants and/or a location of any external contaminants present in the tissue specimen; and determining, based on the prediction of whether a first image region comprises an external contaminant, whether to process the image region using a processing algorithm.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Figure 1A:
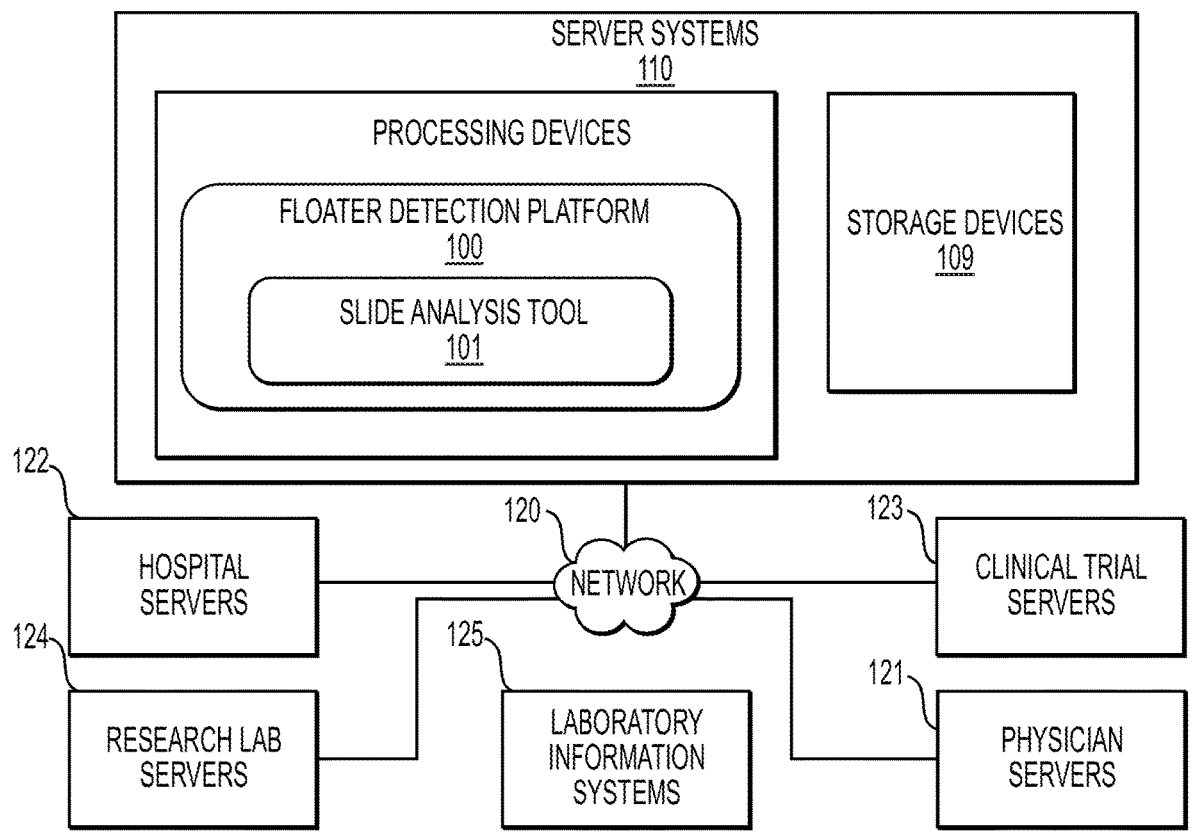
FIG. 1A illustrates an exemplary block diagram of a system and network for determining specimen property or image property information pertaining to digital pathology image(s), according to an exemplary embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

As used herein, the term "exemplary" is used in the sense of "example," rather than "ideal." Moreover, the terms "a" and "an" herein do not denote a limitation of quantity, but rather denote the presence of one or more of the referenced items.

Pathology refers to the study of diseases. More specifically, pathology refers to performing tests and analysis that are used to diagnose diseases. For example, tissue samples may be places onto slides to be viewed under a microscope by a pathologist (e.g., a physician that is an expert at analyzing tissue samples to determine whether any abnormalities exist). That is, pathology specimens may be cut into multiple sections, prepared as slides, and stained for a pathologist to examine and render a diagnosis.

The preparation of a specimen is typically processed in a shared space on the same equipment as other tissue specimens. This may lead to contamination between tissue specimens. The external contaminant in a tissue sample, or floater, may lead to incorrect interpretation of the tissue specimen, which may result in incorrect treatment. External contaminants are generally samples from other tissue slides that are incorrectly introduced into a slide by cross contamination due to limited workspace ("floaters"). By using machine learning and AI to detect these floaters, misdiagnosis and mistreatment rates may decrease in digital pathology.

The process of using computers to assist pathologists is known as computational pathology. Computing methods used for computational pathology may include, but are not limited to, statistical analysis, autonomous or machine learning, and AI. AI may include, but is not limited to, deep learning, neural networks, classifications, clustering, and regression algorithms. By using computational pathology, lives may be saved by helping pathologists improve their diagnostic accuracy, reliability, efficiency, and accessibility. For example, computational pathology may be used to assist with detecting slides suspicious for cancer, thereby allowing pathologists to check and confirm their initial assessments before rendering a final diagnosis.

Histopathology refers to the study of a specimen that has been placed onto a slide. For example, a digital pathology image may be comprised of a digitized image of a microscope slide containing the specimen (e.g., a smear). To assist pathologists in identifying and classifying nuclei, histological stains may be used to make cells visible. Many dye-based staining systems have been developed, including periodic acid-Schiff reaction, Masson's trichrome, nissl and methylene blue, and Haemotoxylin and Eosin (H&E).

A digitized image may be prepared to show a stained microscope slide, which may allow a pathologist to manually view the image on a slide and estimate a number of stained abnormal cells in the image. However, if a tissue specimen includes an external contaminant or floater, the pathologist may incorrectly estimate a number of stained abnormal cells in the image, which in turn may lead to an incorrect diagnosis or treatment plan. If the specimen is contaminated, a pathologist may have a difficult time detecting the presence of a floater, as the excess tissue sample may be difficult to distinguish from the correct tissue specimen, and the floater may have different results to a staining or identification process for abnormal cells.

Computational pathology processes and devices may be used to assist pathologists in detecting abnormalities, such as floaters, that may otherwise be difficult to detect. For example, AI may be used to predict the presence of floaters from individual regions within digital images of prepared tissue samples. The images of the tissues could be whole slide images (WSI), images of tissue cores within microarrays or selected areas of interest within a tissue section. Using normal tissue preparation practice, these floaters may be difficult for humans to visually detect or quantify without the aid of additional testing. Using AI to infer these floaters from digital images of tissues has the potential to improve patient care, while also being faster and less expensive.

As described above, computational pathology processes and devices of the present disclosure may provide an integrated platform allowing a fully automated process including data ingestion, processing and viewing of digital pathology images via a web-browser or other user interface, while integrating with a laboratory information system (LIS). Further, clinical information may be aggregated using cloud-based data analysis of patient data. The data may come from hospitals, clinics, field researchers, etc., and may be analyzed by machine learning, computer vision, natural language processing, and/or statistical algorithms to do real-time monitoring and forecasting of health patterns at multiple geographic specificity levels.

As described above, example embodiments described herein determine whether a floater is present in a selected tissue specimen. For example, computers may be used to analyze an image of a tissue sample to quickly identify whether a floater may be present in a selected tissue specimen, and/or to predict a location of the floater within the tissue specimen. This process has, at least, the benefits of (1) minimizing the amount of time spent by a pathologist determining a slide has a floater present; (2) minimizing the risk of an incorrect interpretation of the findings on a slide; and (3) minimizing the risk of incorrect treatment based on an incorrect interpretation of the findings on a slide.

The below embodiments describe various machine learning algorithm training methods and implementations. These embodiments are merely exemplary. Any training methodologies could be used to train a machine learning model and/or system for the specific purpose of detecting external contaminants in a pathology slide. Below, some exemplary terms are described.

A whole slide image (WSI) may include an entire scanned pathology slide. A training dataset may include a set of whole slide images and/or additional diagnostic data from a set of cases used for training the machine learning (ML) algorithm. A set of labels may be used for each instance in the training data that contain information that an algorithm is being trained to predict (e.g., whether pathologists requested additional testing/re-cuts for a WSI, etc.). A convolutional neural network (CNN) may refer to an architecture that may be built that can scan over the WSI. One embodiment may include training this CNN, using the training labels, to make one prediction per WSI about whether a floater is present. A CNN+ Aggregator may refer to an architecture that may be built to incorporate information from a CNN that is executed over multiple localized regions of a WSI. One embodiment may include training this CNN, using the training labels, to make predictions for each region in the WSI about the likelihood that a floater is present in a specimen or scanned region. In some embodiments, a second model may take individual predictions over tissue/specimen/image regions as inputs and predict the likelihood that the WSI may contain a floater. Model Uncertainty may refer to a machine learning model that may be trained to predict any parameter about, or related to, a WSI, e.g., detection of the presence of a floater. The level of uncertainty the machine learning model has about specific predictions could be computed using a variety of methods, e.g., identifying an ambiguous range of the probability values such as those close to the threshold, using out-of-distribution techniques (Out-of-Distribution detector for Neural Networks (ODIN), tempered mix-up, Mahalanobis distance on the embedding space), etc. This uncertainty could be used to estimate the likelihood a slide may contain a floater.

According to one embodiment, a machine learning model may be trained to predict the presence of a floater in a WSI, or in a selected sub-image of the WSI. The output prediction from this model may then be used to determine whether to process the image region using a processing algorithm.

FIG. 1A illustrates a block diagram of a system and network of determining specimen property or image property information pertaining to digital pathology image(s), using machine learning, according to an exemplary embodiment of the present disclosure.

Specifically, FIG. 1A illustrates an electronic network 120 that may be connected to servers at hospitals, laboratories and/or doctor's offices, etc. For example, physician servers 121, hospital servers 122, clinical trial servers 123, research lab servers 124, and/or laboratory information systems 125, etc., may each be connected to an electronic network 120, such as the Internet, through one or more computers, servers and/or handheld mobile devices. According to an exemplary embodiment of the present application, the electronic network 120 may also be connected to server systems 110, which may include processing devices that are configured to implement a floater detection platform 100, which includes a slide analysis tool 101 for determining specimen property or image property information pertaining to digital pathology image(s), and using machine learning to determine whether a floater or external contaminant is present, according to an exemplary embodiment of the present disclosure.

The physician servers 121, hospital servers 122, clinical trials 123, research lab servers 124 and/or laboratory information systems 125 may create or otherwise obtain images of one or more patients' cytology specimen(s), histopathology specimen(s), slide(s) of the cytology specimen(s), digitized images of the slide(s) of the histopathology specimen(s), or any combination thereof. The physician servers 121, hospital servers 122, clinical trial servers 123, research lab servers 124 and/or laboratory information systems 125 may also obtain any combination of patient-specific information, such as age, medical history, cancer treatment history, family history, past biopsy or cytology information, etc. The physician servers 121, hospital servers 122, clinical trial servers 123, research lab servers 124 and/or laboratory information systems 125 may transmit digitized slide images and/or patient-specific information to server systems 110 over the electronic network 120. Server system(s) 110 may include one or more storage devices 109 for storing images and data received from at least one of the physician servers 121, hospital servers 122, clinical trial servers 123, research lab servers 124, and/or laboratory information systems (LIS) 125. Server systems 110 may also include processing devices for processing images and data stored in the storage devices 109. Server systems 110 may further include one or more machine learning tool(s) or capabilities. For example, the processing devices may include a machine learning tool for a floater detection platform 100, according to one embodiment. Alternatively or in addition, the present disclosure (or portions of the system and methods of the present disclosure) may be performed on a local processing device (e.g., a laptop).

The physician servers 121, hospital servers 122, clinical trial servers 123, research lab servers 124 and/or laboratory information systems 125 refer to systems used by pathologists for reviewing the images of the slides. In hospital settings, tissue type information may be stored in a LIS 125. However, the correct tissue classification information is not always paired with the image content. Additionally, even if an LIS is used to access the specimen type for a digital pathology image, this label may be incorrect due to the fact that many components of an LIS may be manually inputted, leaving a margin for error. According to an exemplary embodiment of the present disclosure, a specimen type may be identified without needing to access the LIS 125, or may be identified to possibly correct LIS 125. For example, a third party may be given anonymized access to the image content without the corresponding specimen type label stored in the LIS. Additionally, access to LIS content may be limited due to its sensitive content.

Figure 1B:
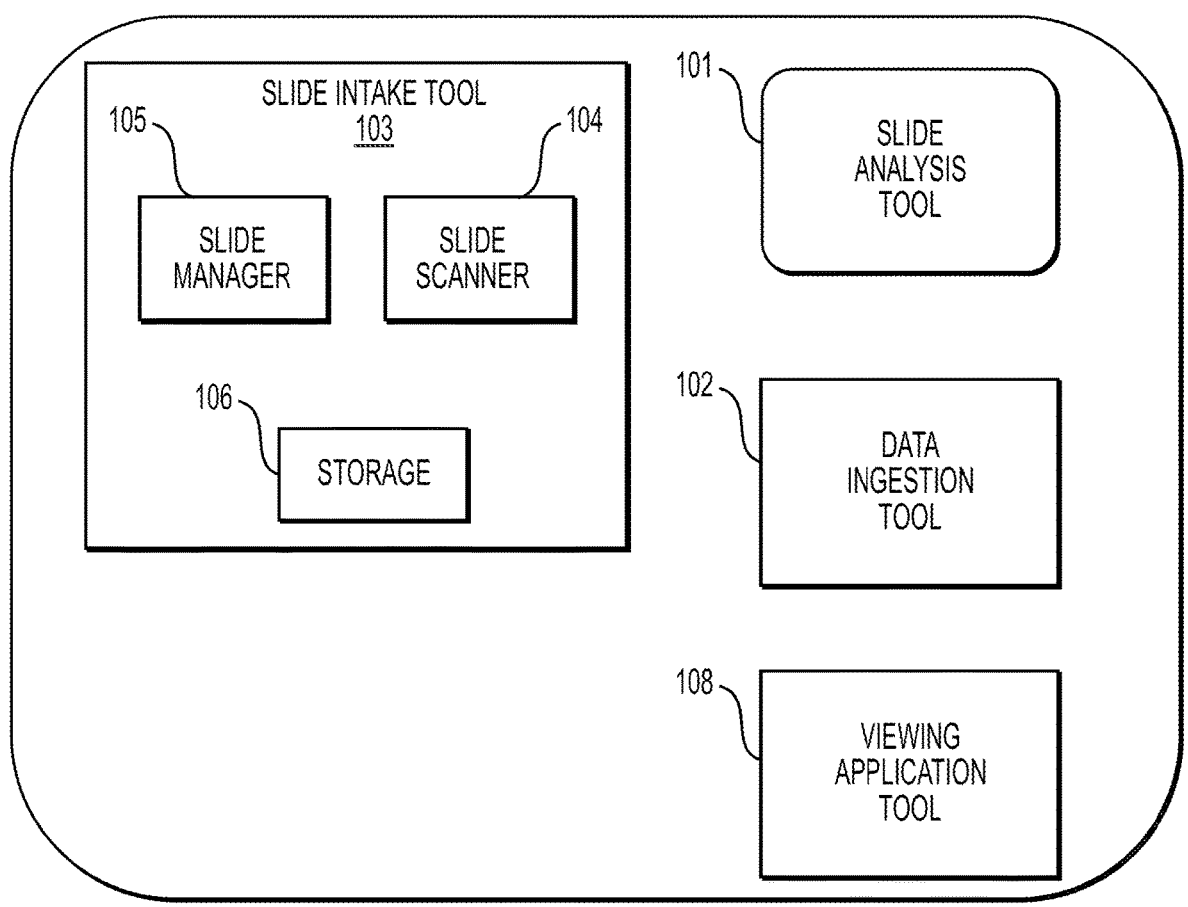
FIG. 1B illustrates an exemplary block diagram of a disease detection platform, according to an exemplary embodiment of the present disclosure.

FIG. 1B illustrates an exemplary block diagram of a floater detection platform 100 for determining specimen property or image property information pertaining to digital pathology image(s), using machine learning.

Specifically, FIG. 1B depicts components of the floater detection platform 100, according to one embodiment. For example, the floater detection platform 100 may include a slide analysis tool 101, a data ingestion tool 102, a slide intake tool 103, a slide scanner 104, a slide manager 105, a storage 106, and a viewing application tool 108.

The slide analysis tool 101, as described below, refers to a process and system for determining specimen property or image property information pertaining to digital pathology image(s), and using machine learning to determine the presence of a floater, according to an exemplary embodiment.

The data ingestion tool 102 refers to a process and system for facilitating a transfer of the digital pathology images to the various tools, modules, components, and devices that are used for classifying and processing the digital pathology images, according to an exemplary embodiment.

The slide intake tool 103 refers to a process and system for scanning pathology images and converting them into a digital form, according to an exemplary embodiment. The slides may be scanned with slide scanner 104, and the slide manager 105 may process the images on the slides into digitized pathology images and store the digitized images in storage 106.

The viewing application tool 108 refers to a process and system for providing a user (e.g. a pathologist) with specimen property or image property information pertaining to digital pathology image(s), according to an exemplary embodiment. The information may be provided through various output interfaces (e.g., a screen, a monitor, a storage device, and/or a web browser, etc.).

The slide analysis tool 101, and each of its components, may transmit and/or receive digitized slide images and/or patient information to server systems 110, physician servers 121, hospital servers 122, clinical trial servers 123, research lab servers 124, and/or laboratory information servers 125 over a network 120. Further, server systems 110 may include storage devices for storing images and data received from at least one of the slide analysis tool 101, the data ingestion tool 102, the slide intake tool 103, the slide scanner 104, the slide manager 105, and viewing application 108. Server systems 110 may also include processing devices for processing images and data stored in the storage devices. Server systems 110 may further include one or more machine learning tool(s) or capabilities, e.g., due to the processing devices. Alternatively or in addition, the present disclosure (or portions of the system and methods of the present disclosure) may be performed on a local processing device such as a laptop.

Any of the above devices, tools and modules may be located on a device that may be connected to an electronic network such as the Internet or a cloud service provider, through one or more computers, servers and/or handheld mobile devices.

Figure 1C:
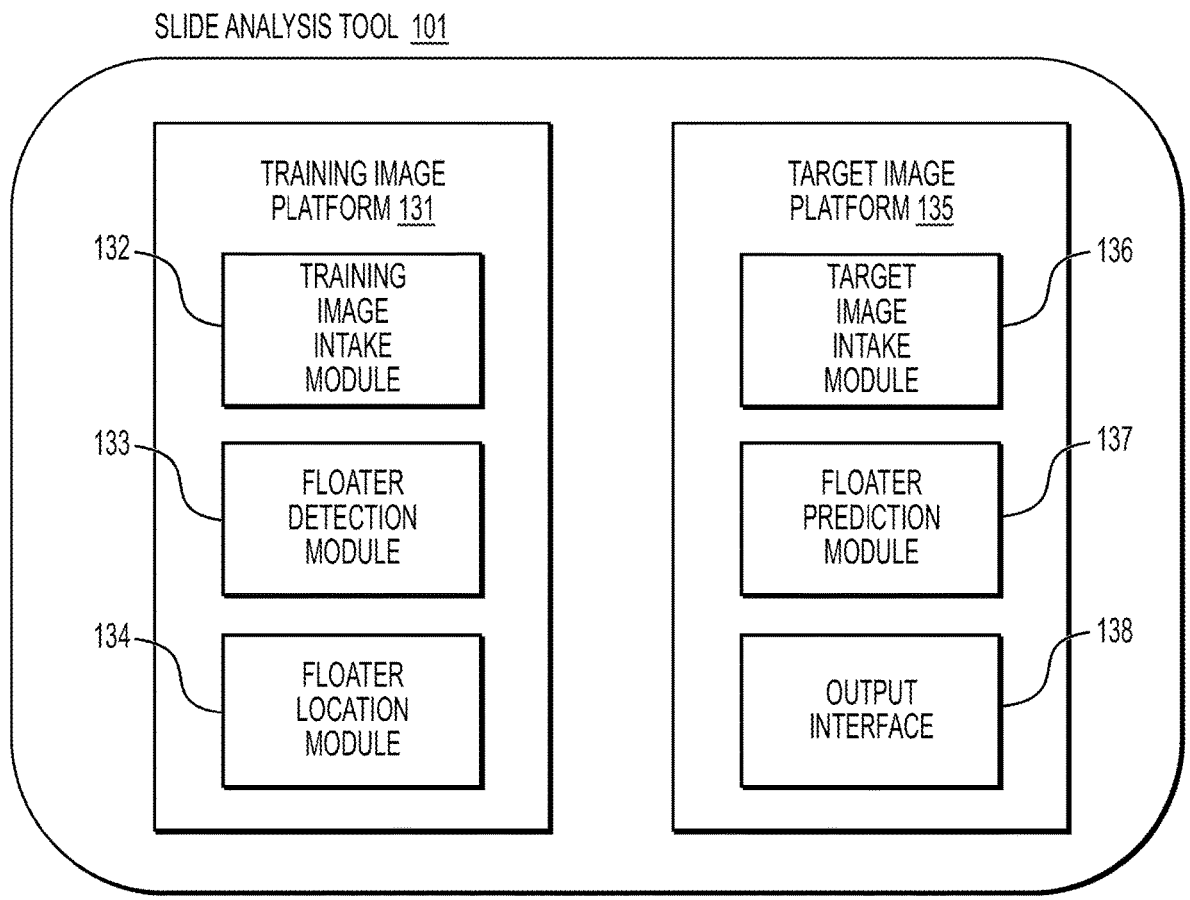
FIG. 1C illustrates an exemplary block diagram of a slide analysis platform, according to an exemplary embodiment of the present disclosure.

FIG. 1C illustrates an exemplary block diagram of a slide analysis platform 101, according to an exemplary embodiment of the present disclosure. The slide analysis tool 101 may include a training image platform 131 and/or a target image platform 135.

According to one embodiment, the training image platform 131 may include a training image intake module 132, a floater detection module 133 and a floater location module 134.

The training image platform 131, according to one embodiment, may create or receive training images that are used to train a machine learning model to effectively process, analyze, and classify digital pathology images. For example, the training images may be received from any one or any combination of the server systems 110, physician servers 121, hospital servers 122, clinical trial servers 123, research lab servers 124, and/or laboratory information systems 125. Images used for training may come from real sources (e.g., humans, animals, etc.) or may come from synthetic sources (e.g. artificial objects or obstructions generated in graphics rendering engines, 3D models, etc.). Examples of digital pathology images may include (a) digitized slides stained with a variety of stains, such as (but not limited to) H&E, Hematoxylin alone, IHC, molecular pathology, etc.; and/or (b) digitized tissue samples from a 3D imaging device, such as microCT.

The training intake module 132 may create or receive a dataset comprising one or more training images corresponding to either or both of images of a human tissue and images that are graphically rendered. For example, the training images may be received from any one or any combination of the server systems 110, physician servers 121, hospital servers 122, clinical trial servers 123, research lab servers 124, and/or laboratory information systems 125. This dataset of images may be kept on a digital storage device. The floater detection module 133 may detect which images contain a floater, based on the received digital image(s) and received data. The floater location module 134 may predict the location of the floater within the image, based on the received digital image(s) and received data.

According to one embodiment, the target image platform 135 may include a target image intake module 136, a floater prediction module 137, and an output interface 138. The target image platform 135 may receive a target image and apply the machine learning model to the received target image to determine whether a floater is present. For example, the target image may be received from any one or any combination of server systems 110, physician servers 121, hospital servers 122, clinical trial servers 123, research lab servers 124, and/or laboratory information systems 125. The target image intake module 136 may receive a target image corresponding to a target specimen. The floater prediction module 137 may apply the machine learning model to the target image to detect floaters and/or predict the location of floaters in the target specimen. For example, the floater prediction module 137 may apply the machine learning model to the target image to determine whether a floater is present in the target specimen.

The output interface 138 may be used to output information about the target image and the target specimen. The information may be output to a screen, a monitor, a storage device, web browser, or any other suitable output.

Figure 2:
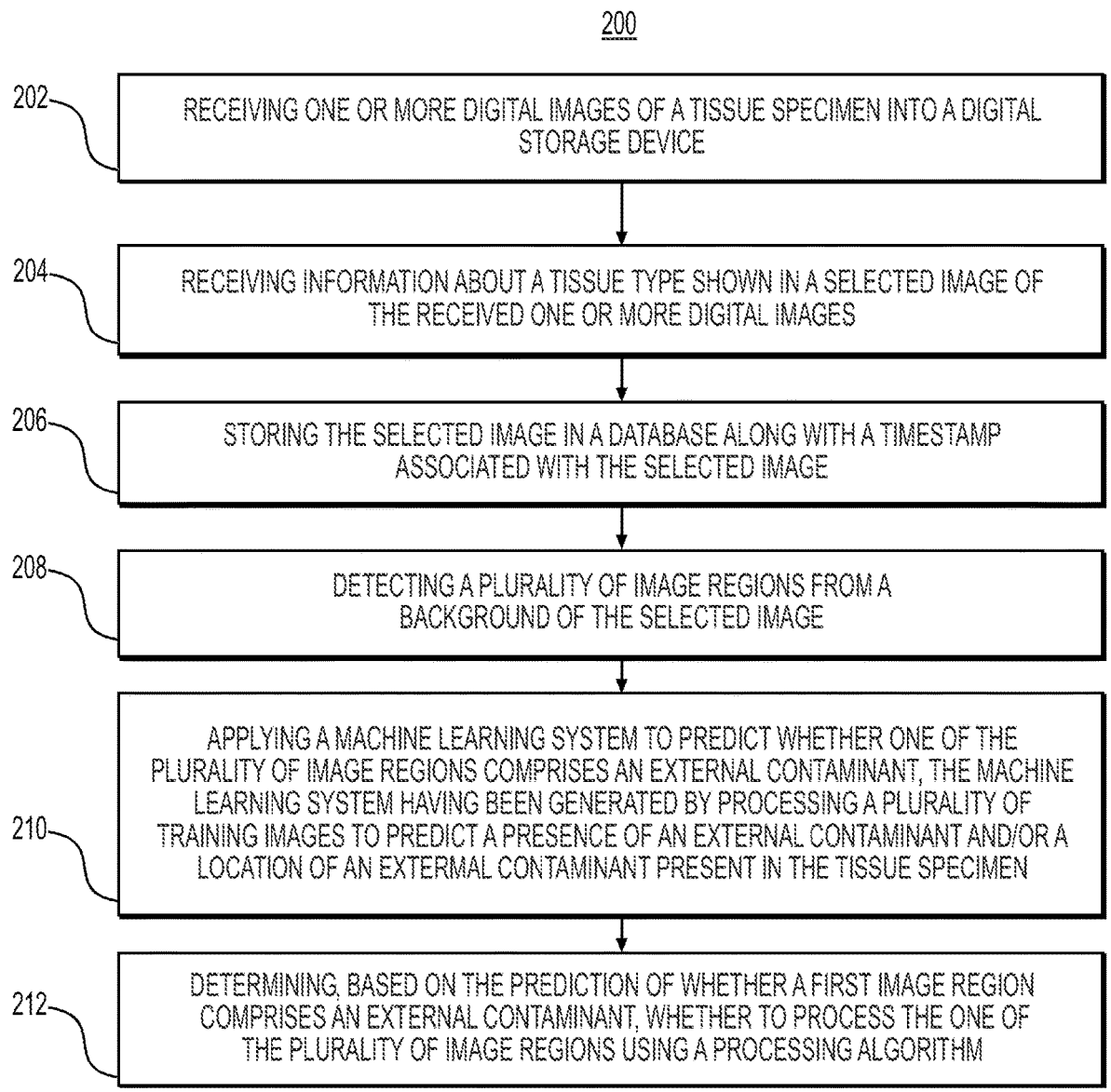
FIG. 2 is a flowchart illustrating an exemplary method for detecting an external contaminant in pathology specimen preparation(s), using machine learning, according to an exemplary embodiment of the present disclosure.

FIG. 2 is a flowchart illustrating an exemplary method of applying a trained AI system to detect floaters in a tissue specimen, according to an exemplary embodiment of the present disclosure. For example, an exemplary method 200 (e.g. steps 202-212) may be performed by the slide analysis tool 101 automatically or in response to a request from a user (e.g. physician, pathologist, etc.).

According to one embodiment, the exemplary method 200 for determining whether a floater is present in a pathology tissue specimen may include one or more of the following steps. In step 202, the method may include receiving one or more digital images of a tissue specimen into a digital storage device. The tissue specimen comprises a tissue sample from a patient. For example, the digital image may be received from any one of the server systems 110, physician servers 121, hospital servers 122, clinical trial servers 123, research lab servers 124, and/or laboratory information systems 125. The digital storage device may comprise a hard drive, a network drive, cloud storage, RAM or any other suitable storage device.

In step 204, the method may include receiving information about a tissue type shown in a selected image of the received one or more digital images. Tissue types may comprise bladder tissue, colon tissue, breast tissue, etc. The digital storable device may label a tissue specimen with the type of tissue that the specimen comprises. This information may enable a system to learn how to recognize each tissue type, in order to identify tissue types that are inconsistent with a tissue type labeled for the selected tissue specimen.

In step 206, the method may include storing the selected image in a database along with a timestamp associated with the selected image. The timestamp may be automatically generated by the system or manually put into the database by a user.

In step 208, the method may include detecting a plurality of image regions from a background of the selected image. A background of the selected image comprises the region of the tissue specimen image that does not comprise the tissue specimen itself. Detecting image regions may involve the use of thresholding based on color or color intensity, texture features, and/or Otsu's method. Thresholding may be followed by running a connected components algorithm. Detecting image regions may alternatively involve the use of segmentation algorithms, such as by k-means, graph cutes, or Mask Region Convolutional Neural Network (Mask R-CNN), or the use of bounding box detection, such as selective search, R-CNN, or Faster R-CNN.

In step 210, the method may include applying a machine learning system to predict whether one of the plurality of image regions comprises an external contaminant, the machine learning system having been generated by processing a plurality of training images to predict a presence of an external contaminant and/or a location of an external contaminant present in the tissue specimen. The method of training the machine learning system is detailed in FIG. 3.

In step 212, the method may include determining, based on the prediction of whether a first image region comprises an external contaminant, whether to process the one of the plurality of image regions using a processing algorithm. The prediction may be output to an electronic storage device. The external contaminant prediction may affect processing by a downstream machine learning system for predicting tissue properties, e.g. cancer status. The external contaminant information may be in the form of a binary variable indicating an external contaminant is present, a numeric confidence score indicating the presence of an external contaminant, a bounding box around a likely external contaminant and a confidence score for the box, a segmentation mask for the external contaminant with a confidence score, etc. This information may be used to tell a downstream algorithm to not process this specific image due to the external contaminant or if the external contaminant region is specified, that image region may be excluded from analysis so that the downstream algorithm does not make an incorrect diagnosis.

An exemplary output to the electronic storage device compares a detached tissue piece to all tissues stored in the database over some time window or interval. If the tissue piece is sufficiently similar to tissues from a patient other than the patient associated with the selected image, the device may generate an alert to the user. The comparison to tissues stored in the database may be facilitated or expedited by looking for only the external contaminant's tissue type. This may be performed by looking for CNN embeddings (e.g., descriptors) or features for each region with a nearest neighbor, or by CNN embedding or features with a metric learning distance-based method.

Another exemplary output from step 212 may display a visual indicator to alert a user that the slide is contaminated with an external contaminant. In a digital pathology workflow with a graphical user interface, this alert may include a text-based warning, an arrow pointing to the external contaminant, a box or frame around the external contaminant region, color-coding of the external contaminant or external contaminant region, highlighting the external contaminant in a predetermined color, a pop-up window displaying a warning, an icon or other visual indicator referencing the external contaminant or external contaminant region, etc. Alternatively, if the digital image was not shown to the user in a graphical user interface, the presence of an external contaminant may be indicated via a warning light, an audio alert or a sound, via a text message, email, an alert saved to a disk or transmitted to a remote monitoring center, etc.

Figure 3:
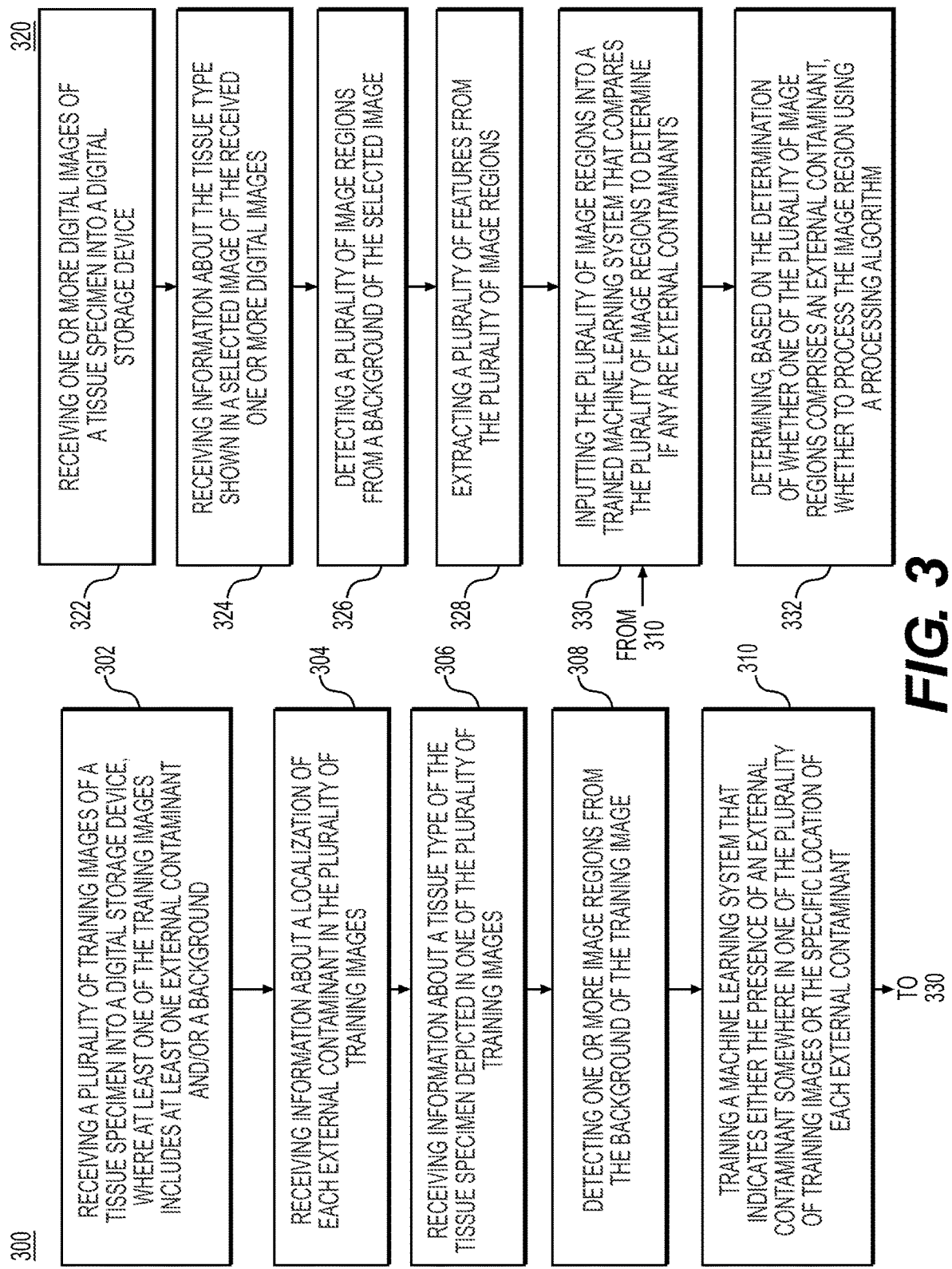
FIG. 3 is a flowchart illustrating an exemplary method for applying machine learning to detecting an external contaminant in pathology specimen preparation(s), according to an exemplary embodiment of the present disclosure.

FIG. 3 is a flowchart illustrating an exemplary method of training and using an AI system for use with an exemplary method of applying and using a trained AI system to detect external contaminants in a tissue specimen that may include one or more of the steps below. For example, exemplary methods 300 and 320 (e.g., steps 302-310, 322-332) may be performed by the slide analysis tool 101 in response to a request from a user.

According to one embodiment, the exemplary method 300 for training an AI system to detect external contaminants may include one or more of the following steps. In step 302, during a training phase, the method may include receiving a plurality of training images of a tissue specimen into a digital storage device, where at least one of the training images includes at least one external contaminant and/or a background. The digital storage device may comprise a hard drive, network drive, cloud storage, RAM, etc. The received image(s) may be two or three-dimensional. For example, the images may be received from any one or any combination of the server systems 110, physician servers 121, hospital servers 122, clinical trial servers 123, research lab servers 124, and/or laboratory information systems 125. Images used for training may come from real sources (e.g., humans, animals, etc.). Examples of digital pathology images may include (a) digitized slides stained with a variety of stains, such as (but not limited to) H&E, IHC, molecular pathology, etc.; and/or (b) digitized tissue samples from a 3D imaging device such as microCT.

In step 304, the method may include receiving information about a localization of each external contaminant in the plurality of training images. This may be include a binary label for the entire image without a specific external contaminant location, a segmentation mask for the external contaminants, or using bounding boxes to indicate the location of each floater.

In step 306, the method may include receiving information about a tissue type of the tissue specimen depicted in one of the plurality of training images. The information may be used to enable to system to learn how to recognize each tissue type, in order to identify tissue types that are inconsistent with the tissue type label for a tissue specimen.

In step 308, the method may include detecting one or more image regions from the background of the training image. Floaters or external contaminants may comprise detached tissues. In order to better find inconsistencies within a plurality of regions in an image, each of the plurality of regions may be processed in relation to the other regions. Inconsistencies may be found by using a variety of methods, including thresholding based on color or intensity of the tissue specimen, texture features, or Otsu's method, followed by running a connected component algorithm. Segmentation algorithms may also be used to find inconsistencies in the region or plurality of regions, such as k-means, graph cuts, Mask R-CNN, etc. A third method of finding inconsistencies may be using bounding box detection, such as selective search, R-CNN, Faster R-CNN, etc.

In step 310, the method may include training a machine learning system that indicates either the presence of an external contaminant somewhere in the training image or the specific location of each external contaminant. This may be done by using a bounding box or a segmentation mask. The machine learning algorithm may be applied to an entire image or a plurality of detected image regions. The algorithm may be implemented in a variety of ways, including but not limited to a CNN, a Region CNN (R-CNN), Faster R-CNN, Mask R-CNN, a convolutional graph neural Network or a relationship neural network, or by feature extraction with hand-engineered features followed by a random forest, support vector machine (SVM), deep learning, multilayer perceptron (MLP), or other approach. The hand-engineered features could include, but are not limited to scale-invariant feature transform (SIFT), speeded up robust features (SURF), rotation invariant feature transform (RIFT), oriented features from accelerated segment test (FAST) and Rotated binary robust independent elementary features (BRIEF) (ORB).

According to one embodiment, an exemplary method 320 for using the slide analysis tool 101 may include one or more of the steps below. In step 322, the method may include receiving one or more digital images of a tissue specimen into a digital storage device, such as a hard drive, network drive, cloud storage, RAM, etc. For example, the image may be received from any one or any combination of the server systems 110, physician servers 121, hospital servers 122, clinical trial servers 123, research lab servers 124, and/or laboratory information systems 125. In step 324, the method may include receiving information about the tissue type shown in a selected image of the received one or more digital images. Tissue types may comprise bladder tissue, colon tissue, breast tissue, etc. The digital storable device may label a tissue specimen with the type of tissue that the specimen comprises. This information may enable a system to learn how to recognize each tissue type, in order to identify tissue types that are inconsistent with a tissue type labeled for the selected tissue specimen.

In step 324, the method may include receiving information about the tissue type shown in a selected image of the received one or more images. The information may be used to enable to system to learn how to recognize each tissue type, in order to identify tissue types that are inconsistent with the tissue type label for a tissue specimen.

In step 326, the method may include detecting a plurality of image regions from a background of the selected image. A background of the selected image comprises the region of the tissue specimen image that does not comprise the tissue specimen itself. Detecting image regions may involve the use of thresholding based on color or intensity, texture features, and/or Otsu's method. Thresholding may be followed by running a connected components algorithm. Detecting image regions may alternatively involve the use of segmentation algorithms, such as by k-means, graph cutes, or Mask Region Convolutional Neural Network (Mask R-CNN), or the use of bounding box detection, such as selective search, R-CNN, or Faster R-CNN.

In step 328, the method may include extracting a plurality of features from the plurality of image regions. The features may include, but are not limited to, SIFT, SURF, RIFT, and ORB.

In step 330, the method may include inputting the plurality of image regions into a trained machine learning system that compares the plurality of image regions to determine if any are external contaminants.

In step 332, the method may include determining, based on the prediction of whether a first image region comprises an external contaminant or floater, whether to process the image region using a processing algorithm. The prediction may be output to an electronic storage device. Using the floater or external contaminant prediction may affect processing by a downstream machine learning system for predicting tissue properties, e.g. cancer status. The floater or external contaminant information may be in the form of a binary variable indicating a floater or external contaminant is present, a numeric confidence score indicating the presence of a floater or external contaminant, a bounding box around a likely floater or external contaminant and a confidence score for the box, a segmentation mask for the floater or external contaminant with a confidence score, etc. This information may be used to tell a downstream algorithm to not process this specific image due to the floater or external contaminant or if the floater or external contaminant region is specified, that image region may be excluded from analysis so that the downstream algorithm does not make an incorrect diagnosis.

An exemplary output to the electronic storage device is comparing a detached tissue piece to all tissues stored in the database over some time window or interval. If the tissue piece is sufficiently similar to tissues from a patient other than the patient associated with the selected image, the device may generate an alert to the user. The comparison to tissues stored in the database may be facilitated or expedited by looking for only the floater's tissue type. Looking for only the floater's tissue type may be done by looking for CNN embeddings or features for each region with a nearest neighbor, or by CNN embedding or features with a metric learning distance-based method.

Another exemplary output from step 332 may display a visual indicator to alert a user that the slide is contaminated with a floater or external contaminant. In a digital pathology workflow with a graphical user interface, this alert may include a text-based warning, an arrow pointing to the floater or external contaminant, a box or frame around the floater or external contaminant region, color-coding of the floater or external contaminant or floater or external contaminant region, highlighting the floater or external contaminant in a predetermined color, a pop-up window displaying a warning, an icon or other visual indicator referencing the floater or external contaminant or floater or external contaminant region, etc. Alternatively, if the digital image was not shown to the user in a graphical user interface, the presence of a floater or external contaminant may be indicated via a warning light, an audio alert or a sound, via a text message, email, an alert saved to a disk or transmitted to a remote monitoring center, etc.

Figure 4:
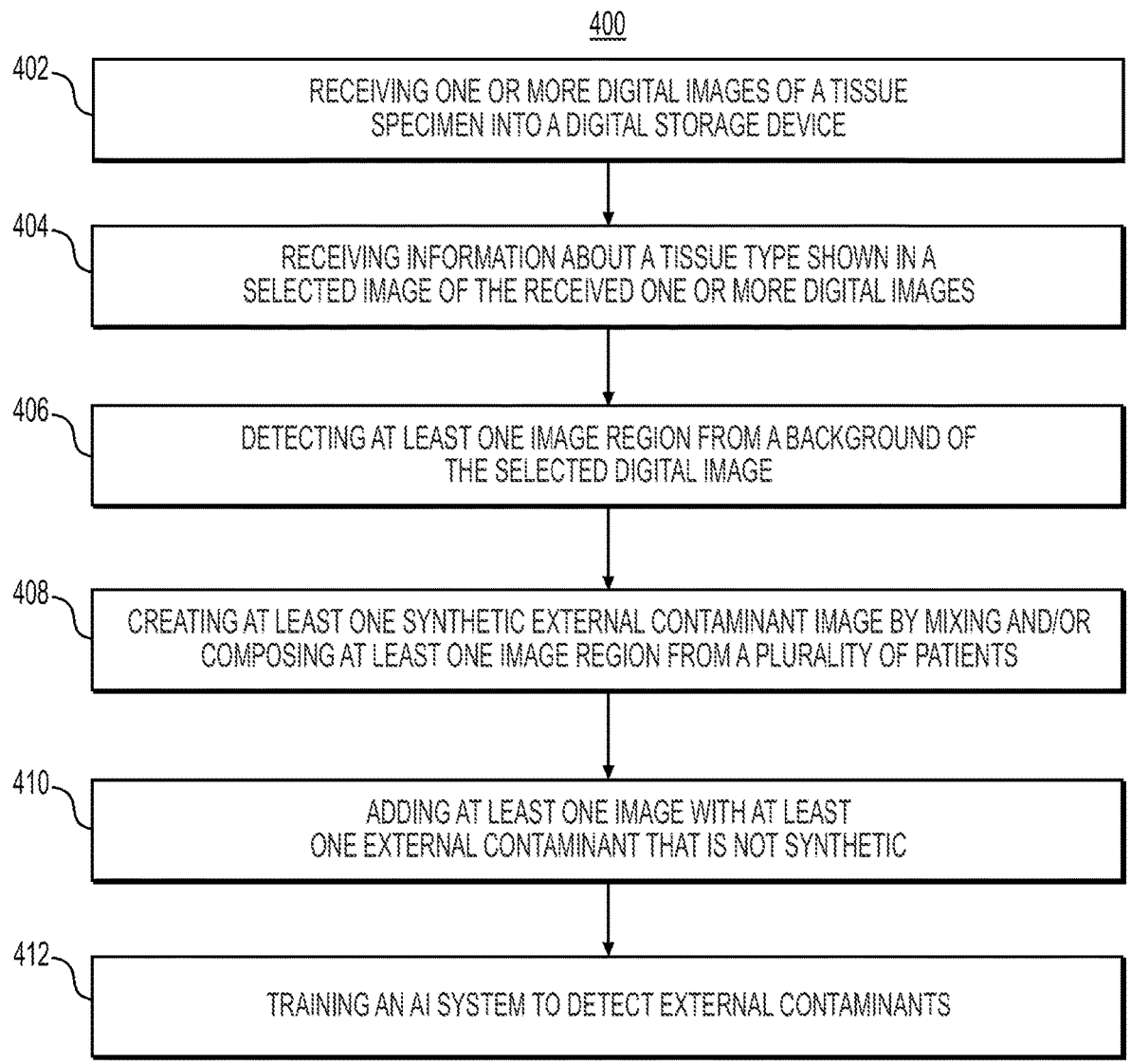
FIG. 4 is a flowchart illustrating an exemplary method of creating a dataset of external contaminants within a pathology specimen, according to an exemplary embodiment of the present disclosure.

Using supervised machine learning to detect floaters or external contaminants may be challenging because floaters occur infrequently. This makes it difficult to gather enough data to train a supervised system. This deficiency of available training data can be addressed by using synthetic floaters. FIG. 4 is a flowchart illustrating an exemplary method of creating a dataset of contaminants within a pathology specimen that may include one or more of the steps below. For example, exemplary method 400 may be performed by the slide analysis tool 101 in response to a request from a user. In step 402, the method may include receiving one or more digital images of a tissue specimen into a digital storage device. The tissue specimen may comprise a tissue sample from a patient. Images may be received from any one or any combination of the server systems 110, physician servers 121, hospital servers 122, clinical trial servers 123, research lab servers 124, and/or laboratory information systems 125. In step 404, the method may include receiving information about the tissue type shown in a selected image of the received one or more digital images. Tissue types may comprise bladder tissue, colon tissue, breast tissue, etc. The digital storable device may label a tissue specimen with the type of tissue that the specimen comprises. This information may enable a system to learn how to recognize each tissue type, in order to identify tissue types that are inconsistent with a tissue type labeled for the selected tissue specimen.

In step 404, the method may include receiving information about a tissue type shown in a selected image of the received one or more digital images.

In step 406, the method may include detecting at least one image region from a background of the selected image. A background of the selected image comprises the region of the tissue specimen image that does not comprise the tissue specimen itself. As external contaminants may be detached tissues, each region may be processed in relation to other regions to determine if one or more region(s) are inconsistent with other region(s). Detecting inconsistent image regions may involve the use of thresholding based on color or intensity, texture features, and/or Otsu's method. Thresholding may be followed by running a connected components algorithm. Detecting image regions may alternatively involve the use of segmentation algorithms, such as by k-means, graph cutes, or Mask Region Convolutional Neural Network (Mask R-CNN), or the use of bounding box detection, such as selective search, R-CNN, or Faster R-CNN.

In step 408, the method may include creating at least one synthetic external contaminant image by mixing and/or composing at least one image region from a plurality of patients. The images may comprise the same tissue type or a plurality of different tissue types. One embodiment may include blending the plurality of images together using image processing or a machine learning based approach, e.g. generative adversarial networks.

In step 410, the method may include adding at least one image with at least one external contaminant that is not synthetic. These images may comprise images with external contaminants labeled by humans.

In step 412, the method may include training an AI system to detect the presence of external contaminants. Training an AI system is further detailed in method 500, described below.

Figure 5:
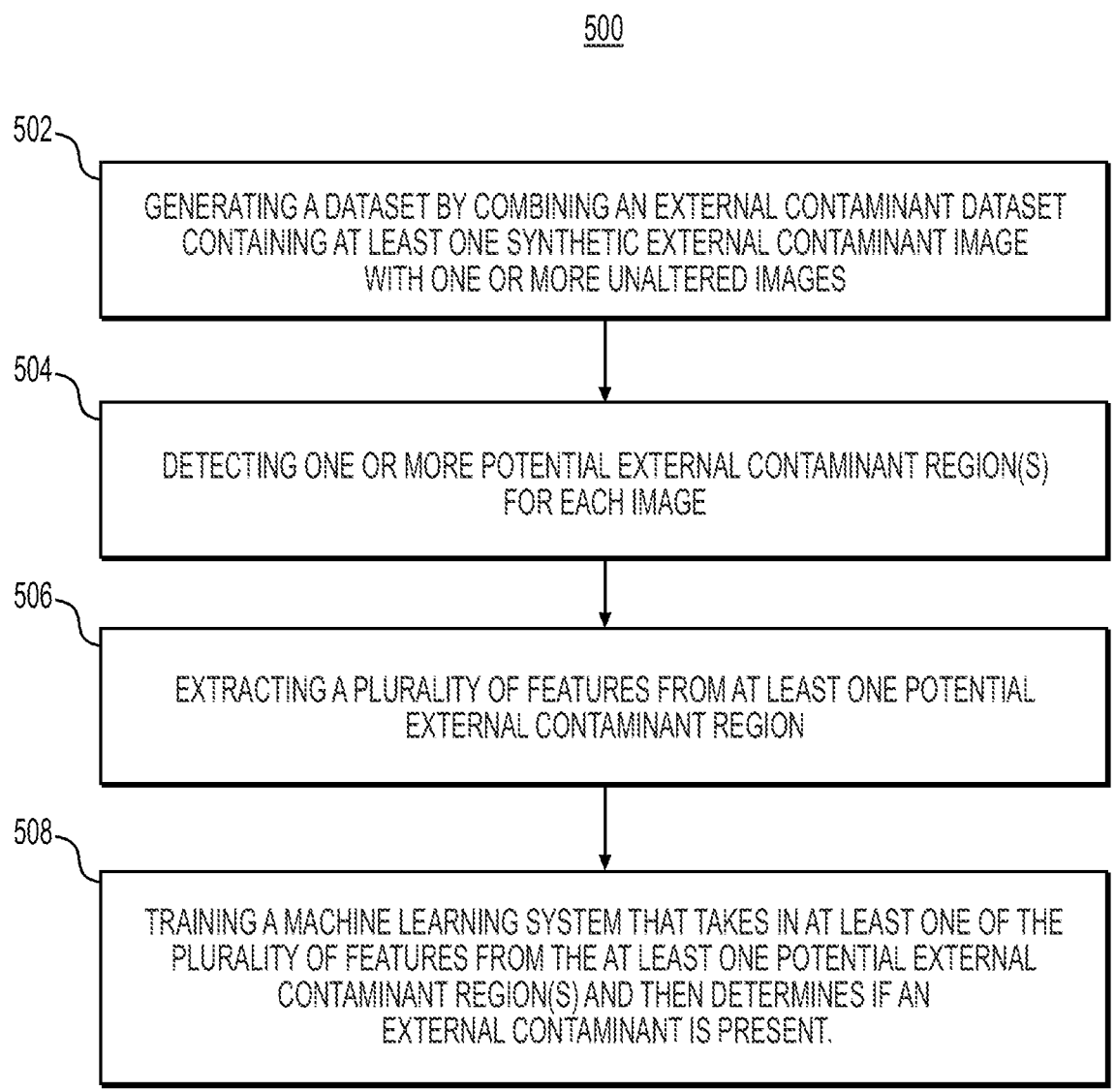
FIG. 5 is a flowchart illustrating an exemplary method of training an AI system to detect external contaminants within a pathology specimen, using one or more synthetic contaminants, according to an exemplary embodiment of the present disclosure.

FIG. 5 is a flowchart illustrating an exemplary method 500 of training an AI system to detect external contaminants, using one or more synthetic external contaminants. The method 500 may include one or more of the following steps. In a step 502, the method may include generating a dataset by combining an external contaminant dataset containing at least one synthetic external contaminant image with one or more unaltered images.

In a step 504, the method may include detecting one or more potential external contaminant region(s) for each image. Detecting the one or more potential external contaminant region(s) may be done in a variety of ways, including but not limited to thresholding based on color/color intensity, textured features, or Otsu's method, followed by running a connected components algorithm; using segmentation algorithms, such as k-means, graph cuts, Mask R-CNN, etc.; or bounding box detection, such as selective search, R-CNN, Faster R-CNN, etc.

In a step 506, the method may include extracting a plurality of features from at least one potential external contaminant region. Feature extraction may be done using, for example, one of the following methods: pre-trained CNN features and/or embeddings; SIFT features; and/or SURF features.

In a step 508, the method may include training a machine learning system that takes in at least one of the plurality of features from the at least one potential external contaminant region(s) and then determines if an external contaminant is present. The machine learning algorithm may include, but is not limited to, the following: CNN; Recurrent neural network (RNN), including gated recurrent unit (GRU) and long-short term memory (LSTM) networks; multi-layer perceptron; convolutional graph neural network; and/or relationship neural network.

Figure 6:
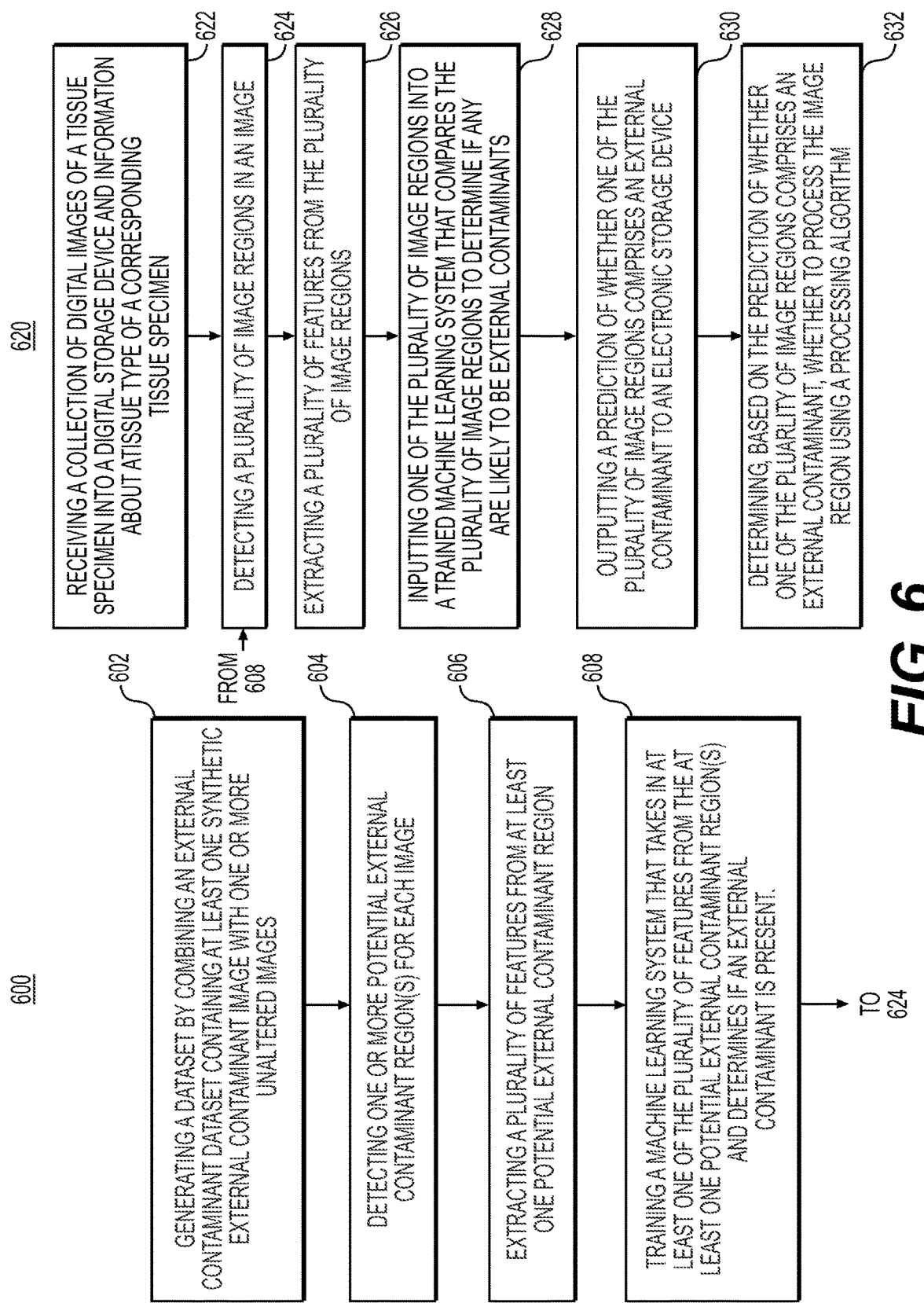
FIG. 6 is a flowchart illustrating an exemplary method of applying and using a synthetic external contaminant dataset-trained AI system, according to an exemplary embodiment of the present disclosure.

FIG. 6 is a flowchart illustrating an exemplary methods of training and using a synthetic floater dataset-trained AI system. For example, exemplary methods 600 and 620 (e.g., steps 602-632), may be performed by the slide analysis tool 101 in response to a request by a user (e.g., a physician).

According to one embodiment, the exemplary method 600 for applying the synthetic floater dataset-trained AI system may include one or more of the following steps. In step 602, the method may include generating a dataset by combining an external contaminant dataset containing at least one synthetic external contaminant image with one or more unaltered images.

In step 604, the method may include detecting one or more potential external contaminant region(s) for each image. Detecting the one or more potential external contaminant region(s) may be done in a variety of ways, including: thresholding based on color, color intensity and/or texture features, Otsu's method, etc., followed by cunning the connected components algorithm; segmentation algorithms, such as k-means, graph cuts, Mask R-CNN, etc.; or bounding box detection, such as selective search, R-CNN, Faster R-CNN, etc.

In step 606, the method may include extracting a plurality of features from at least one potential external contaminant region. Feature extraction may be done using pre-trained CNN features and/or embeddings, SIFT features, and/or SURF features.

In step 608, the method may include training a machine learning system that takes in at least one of the plurality of features from the at least one potential external contaminant region(s) and determines if an external contaminant is present. Determining if an external contaminant is present may be done by using a variety of methods, which includes but is not limited to CNN; RNN, including Gated Recurrent Unit (GRU) and Long-Short Term Memory (LSTM); multilayer perceptron (MLP); convolution graph neural network; and/or relationship neural network.

According to one embodiment, an exemplary method 620 for using the synthetic external contaminant dataset-trained AI system may include one or more of the steps below. In step 622, the method may include receiving a collection of digital images of a tissue specimen into a digital storage device and information about a tissue type of a corresponding tissue specimen. For a selected digital image of the collection of digital images, the method may include receiving information about a tissue type of a tissue specimen shown in the selected digital image. The digital storage device may comprise a hard drive, network drive, cloud storage, RAM, etc. Images may be received from any one or any combination of the server systems 110, physician servers 121, hospital servers 122, clinical trial servers 123, research lab servers 124, and/or laboratory information systems 125.

In step 624, the method may include detecting a plurality of regions in an image. Detecting the plurality of regions may comprise the same detecting method as used in training the trained AI system in step 604 in method 600.

In step 626, the method may include extracting a plurality of features from the plurality of image regions. This extraction may comprise the same extracting methods as used in training the trained AI system in step 606 in method 600.

In step 628, the method may include inputting each image region into a trained machine learning system that compares the plurality of image regions to determine if any are likely to comprise external contaminants. This comparison may be implemented by a variety of methods, including but not limited to CNN; RNN, including Gated Recurrent Unit (GRU) and Long Short-Term Memory (LSTM); graph neural network; convolutional graph neural network; and/or relationship neural network.

In step 630, the method may include outputting a prediction of whether one of the plurality of image regions comprises an external contaminant to an electronic storage device. The prediction may be output in one of, but is not limited to, the following methods: outputting a specific region containing a floater or external contaminant as a segmentation mask, for example by using a set of coordinates or using a bounding box.

In step 632, the method may include determining, based on the output prediction of whether a first image region comprises an external contaminant, whether to process the image region using a processing algorithm. If an external contaminant is detected, the method may include generating an alert. This alert may take several potential forms, including but not limited to: a pop up window telling a user that an external contaminant is present; a marker displayed on the image indicating where the external contaminant is located; a coloration around and/or over the external contaminant; a banner showing information about the specimen and/or patient who the external contaminant may belong to.

Figure 7:
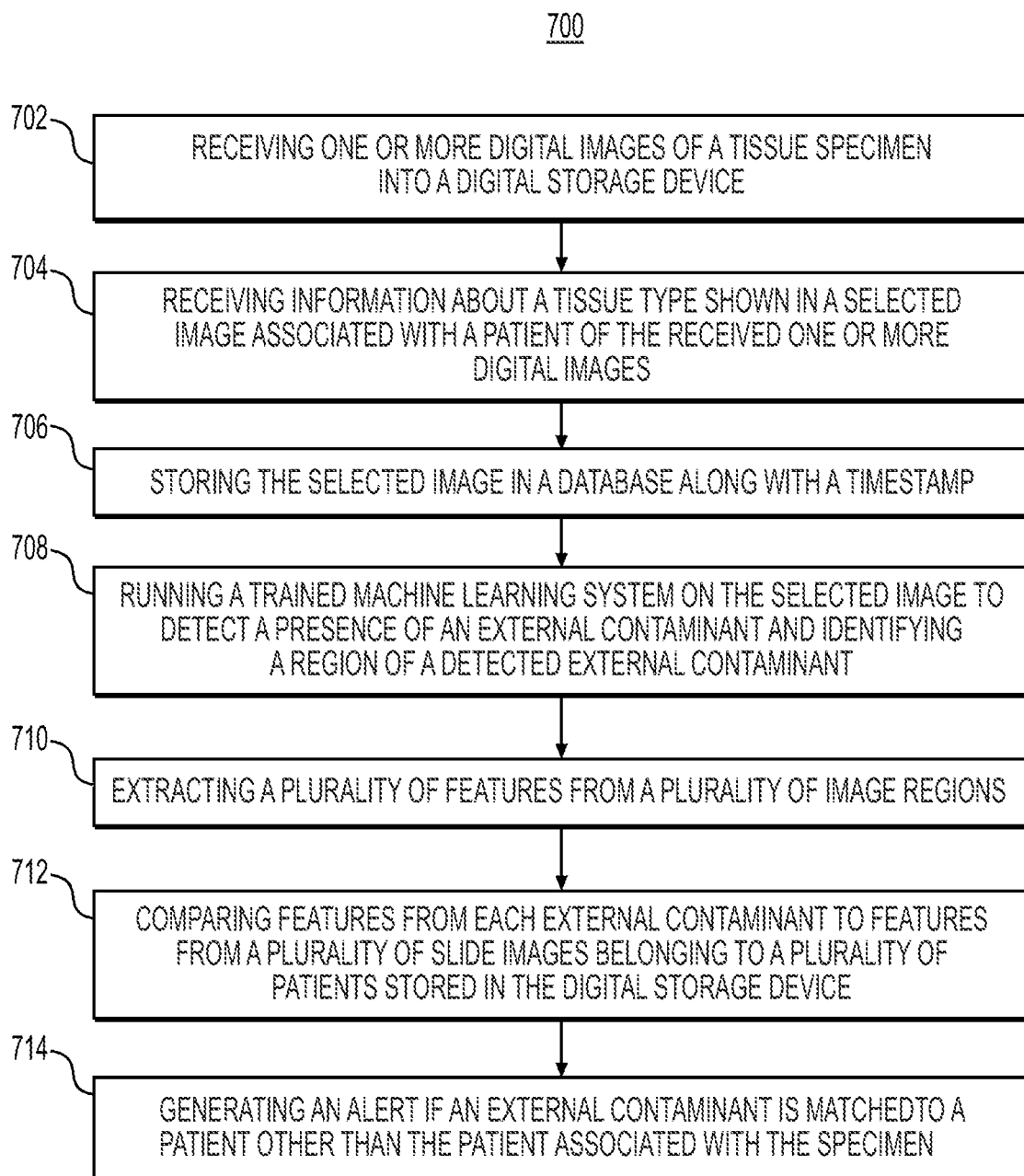
FIG. 7 is a flowchart illustrating an exemplary method of external contaminant detection with source identification using a recent patient database, according to an exemplary embodiment of the present disclosure.

Floaters may be from other patients whose tissue specimens were processed over the past few hours or days. The above embodiment may identify that a floater is present. The following embodiment may build on the above embodiment, to enable identification of the source or an identified floater. FIG. 7 is a flowchart illustrating an exemplary method of applying and using a floater detection system with source identification using recent patient database. For example, exemplary methods 700 may be performed by the slide analysis tool 101 in response to a request by a user (e.g., a physician).

In step 702, the method may include receiving one or more digital images of a tissue specimen into a digital storage device. The tissue specimen may comprise a tissue sample from a patient. For example, the digital image may be received from any one of the server systems 110, physician servers 121, hospital servers 122, clinical trial servers 123, research lab servers 124, and/or laboratory information systems 125. The digital storage device may comprise a hard drive, a network drive, cloud storage, RAM or any other suitable storage device. For a selected digital image of the collection of digital images, the method may further include an identifier of a patient associated with the specimen and information about the tissue type of the tissue specimen shown in the selected digital image.

In step 704, the method may include receiving information about a tissue type shown in a selected image associated with a patient of the received one or more digital images. Tissue types may comprise bladder tissue, colon tissue, breast tissue, etc. The digital storable device may label a tissue specimen with the type of tissue that the specimen comprises. This information may enable a system to learn how to recognize each tissue type, in order to identify tissue types that are inconsistent with a tissue type labeled for the selected tissue specimen.

In step 706, the method may include storing the selected image in a database along with a timestamp associated with the selected image. The timestamp may be automatically generated by the system or manually put into the database by a user.

In step 708, the method may include running a trained machine learning system on the selected image to detect a presence of an external contaminant, and identifying a location of a detected external contaminant.

In step 710, the method may include extracting a plurality of features from a plurality of image regions. Extraction may be done using CNN embeddings, SIFT features, SURF features, or ORB features.

In step 712, the method may include comparing a plurality of features from each external contaminant to a plurality of features of slide images belonging to a plurality of patients stored in the digital storage device. This comparison may be between slide images belonging to patients that were recently prepared by the same laboratory that are stored in the database. These patients may be patients other than the patient associated with the specimen. The comparison may be done using nearest neighbor, metric learning, or any other suitable method.

In step 714, the method may include generating an alert if an external contaminant is matched to a patient other than the patient associated with the specimen. The alert may include a banner, a text-based message, a special symbol, or any other suitable alert. Additionally, the method may include displaying the matched image in a user interface, or logging the detected external contaminant and its source to an electronic storage.

Figure 8:
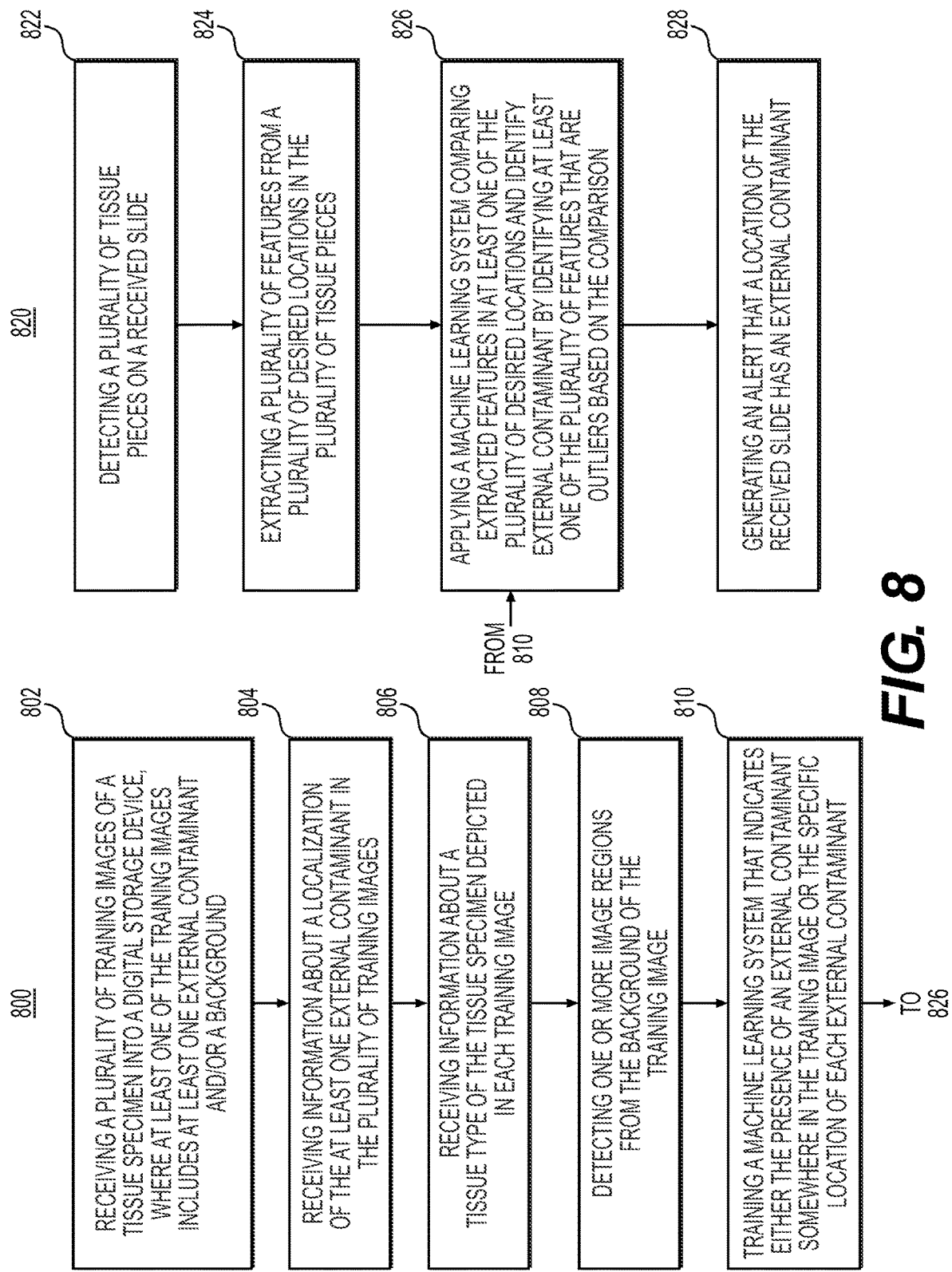
FIG. 8 is a flowchart illustrating an exemplary method of detached tissue detection using outlier detection, according to an exemplary embodiment of the present disclosure.

FIG. 8 is a flowchart illustrating an exemplary method of training and using an external contaminant detection system with a machine learning system and source identification using outlier tissue detection. For example, exemplary methods 800 and 820 may be performed by the slide analysis tool 101 in response to a request by a user (e.g., a physician).

In step 802, the method may include receiving a plurality of training images of a tissue specimen into a digital storage device, where at least one of the training images includes at least one external contaminant and/or a background. The tissue specimen may comprise a tissue sample from a patient. For example, the digital image may be received from any one of the server systems 110, physician servers 121, hospital servers 122, clinical trial servers 123, research lab servers 124, and/or laboratory information systems 125. The digital storage device may comprise a hard drive, a network drive, cloud storage, RAM or any other suitable storage device.

In a step 804, the method may include receiving information about a localization of the at least one external contaminant in the plurality of training images.

In a step 806, the method may include receiving information about a tissue type of the tissue specimen depicted in each training image. Tissue types may comprise bladder tissue, colon tissue, breast tissue, etc. The digital storable device may label a tissue specimen with the type of tissue that the specimen comprises. This information may enable a system to learn how to recognize each tissue type, in order to identify tissue types that are inconsistent with a tissue type labeled for the selected tissue specimen.

In a step 808, the method may include detecting one or more image regions from the background of the training image.

In a step 810, the method may include training a machine learning system that indicates either a presence of an external contaminant somewhere in the training image or a specific location of each external contaminant.

In step 822, the method may include detecting a plurality of tissue pieces on a received slide. Detection may be done in a number of ways, which includes using Otsu's method or some other thresholding-based scheme, followed by connected components to identify each piece of tissue; bounding box detection methods, including Faster R-CNN, Selective Search, EdgeBoxes, or DeepBox; and semantic segmentation or instance segmentation methods, such as fully convolutional neural network, Mask R-CNN, U-Net, or any other suitable method.

In step 824, the method may include extracting a plurality of features from a plurality of desired locations in the plurality of tissue pieces. Extracted features may comprise CNN features and embeddings, SIFT features, and/or SURF features.

In step 826, the method may include applying a machine learning system comparing extracted features in at least one of the plurality of desired locations and identify an external contaminant by identifying at least one of the plurality of features that are outliers based on the comparison. This comparison may be done using a variety of density estimation methods, which may include using a nearest neighbor algorithm to determine which is an outlier buy comparing all features in each region to each other region. If the nearest neighbor has too great a predetermined distance (as determined by a Euclidean distance in feature space or some other metric), it may be flagged as a potential external contaminant. The comparison may also be done using the local outlier floater algorithm, or any other suitable comparison method.

In step 828, the method may include generating an alert that a location of the received slide has an external contaminant. If a potential external contaminant is detected, the alert could take several potential forms. These forms include but are not limited to a pop-up window telling the user that a floater is present, a marker displayed on the image indicating where the floater is located, or any other suitable alert.

Figure 9:
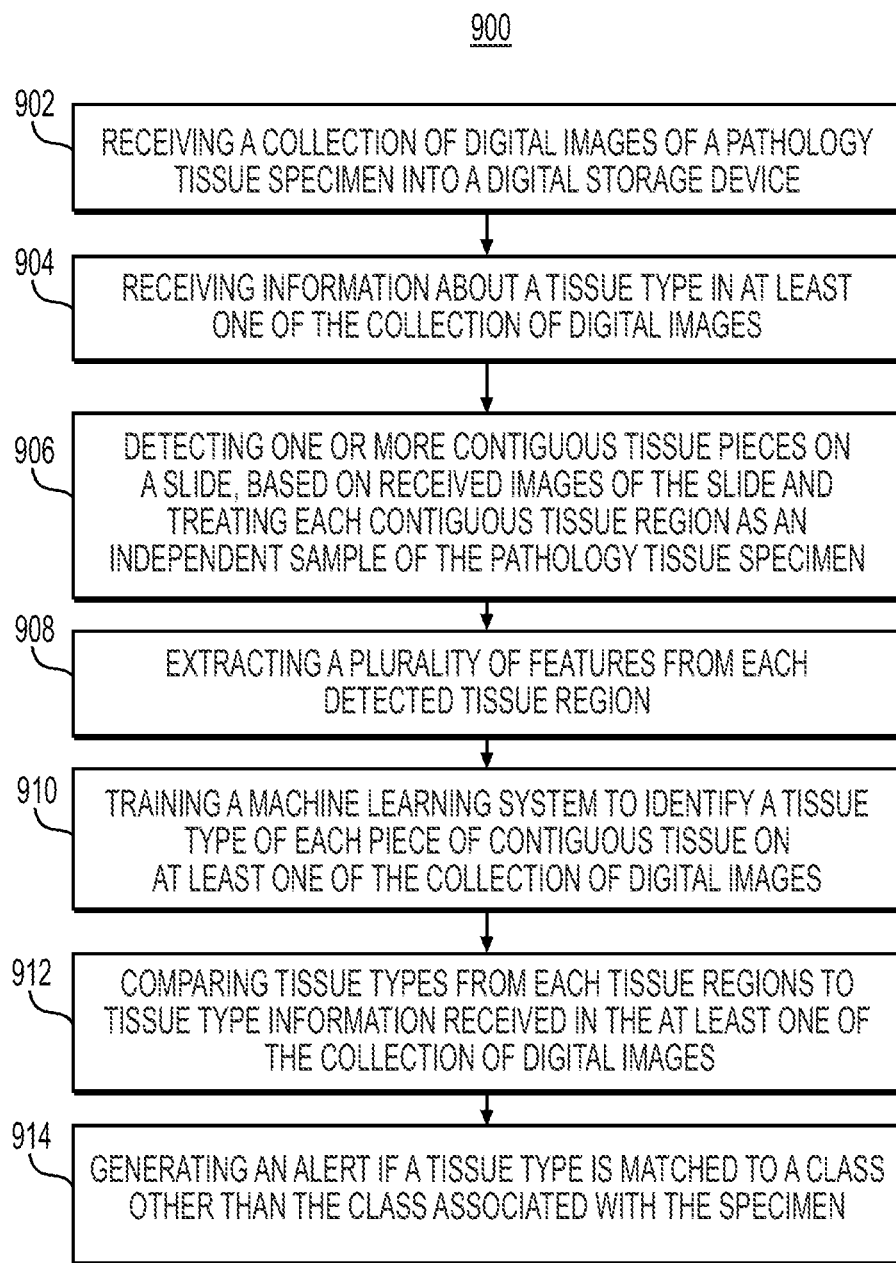
FIG. 9 is a flowchart illustrating an exemplary method of training an AI system to classify tissue types in an image, according to an exemplary embodiment of the present disclosure.

FIG. 9 is a flowchart illustrating an exemplary method of training a machine learning system to compare tissue specimens. For example, exemplary method 900 may be performed by the slide analysis tool 101 in response to a request by a user (e.g., a physician).

In step 902, the method may include receiving a collection of digital images of a pathology tissue specimen into a digital storage device. The digital storage device may comprise a hard drive, a network drive, cloud storage, RAM, or any other suitable storage device.

In step 904, the method may include receiving information about a tissue type in at least one of the collection of digital images. Tissue type may comprise information about the tissue type represented on the digital slide, such as bladder tissue, breast tissue, lung tissue, etc.

In step 906, the method may include detecting one or more contiguous pieces on the slide, based on the received image(s) of each slide and treating each contiguous tissue region as an independent sample of the pathology tissue specimen. Detection may be done using a variety of ways, include but not limited to Otsu's method or some other thresholding-based scheme, followed by connected components to identify each piece of tissue; bounding box detection methods, including Faster R-CNN, Selective Search, EdgeBoxes, or DeepBox; Semantic segmentation or instance segmentation methods, such as fully convolutional network, Mask R-CNN, U-Net, or any other suitable detection method.

In step 908, the method may include extracting a plurality of features from each detected tissue region. Features may include but are not limited to convolutional neural network (CNN) features and/or embeddings, SIFT features, and/or SURF features.

In step 910, the method may include training a machine learning system to identify a tissue type of each piece of contiguous tissue on at least one of the collection of digital images. Training may be implemented using a variety of methods, including but not limited to: end-to-end deep neural network; CNN; RNN, including GRU and LSTM; graph neural network; convolutional graph neural network; relationship neural network; and any other suitable method.

In step 912, the method may include comparing tissue types from each tissue region to tissue type information received in the at least one of the collection of digital images.

In step 914, generating an alert if a tissue type is matched to a class other than the class associated with the specimen. This alert may comprise a pop-up window on a display telling the user that an external contaminant is present, a marker displayed on the image indicating where the external contaminant is located. The method may additionally include outputting one or more regions with non-intended tissues, which are likely to comprise external contaminants, to an electronic storage.

As external contaminants may exist in the training dataset, there is a possibility of label noise. In other words, the label on some contiguous tissue pieces in the training database could be wrong because they are external contaminants. While this is likely to be overcome with a sufficiently large database, an alternative is to use robust learning methods. Methods that learn in the presence of label noise could be utilized such as robust training using mean absolute error, improved mean absolute error, etc. Alternatively, methods such as confident learning theory (cleanlab) may also be used to identify training samples that are likely to be external contaminants in the training set so that they may be removed from the set.

Figure 10:
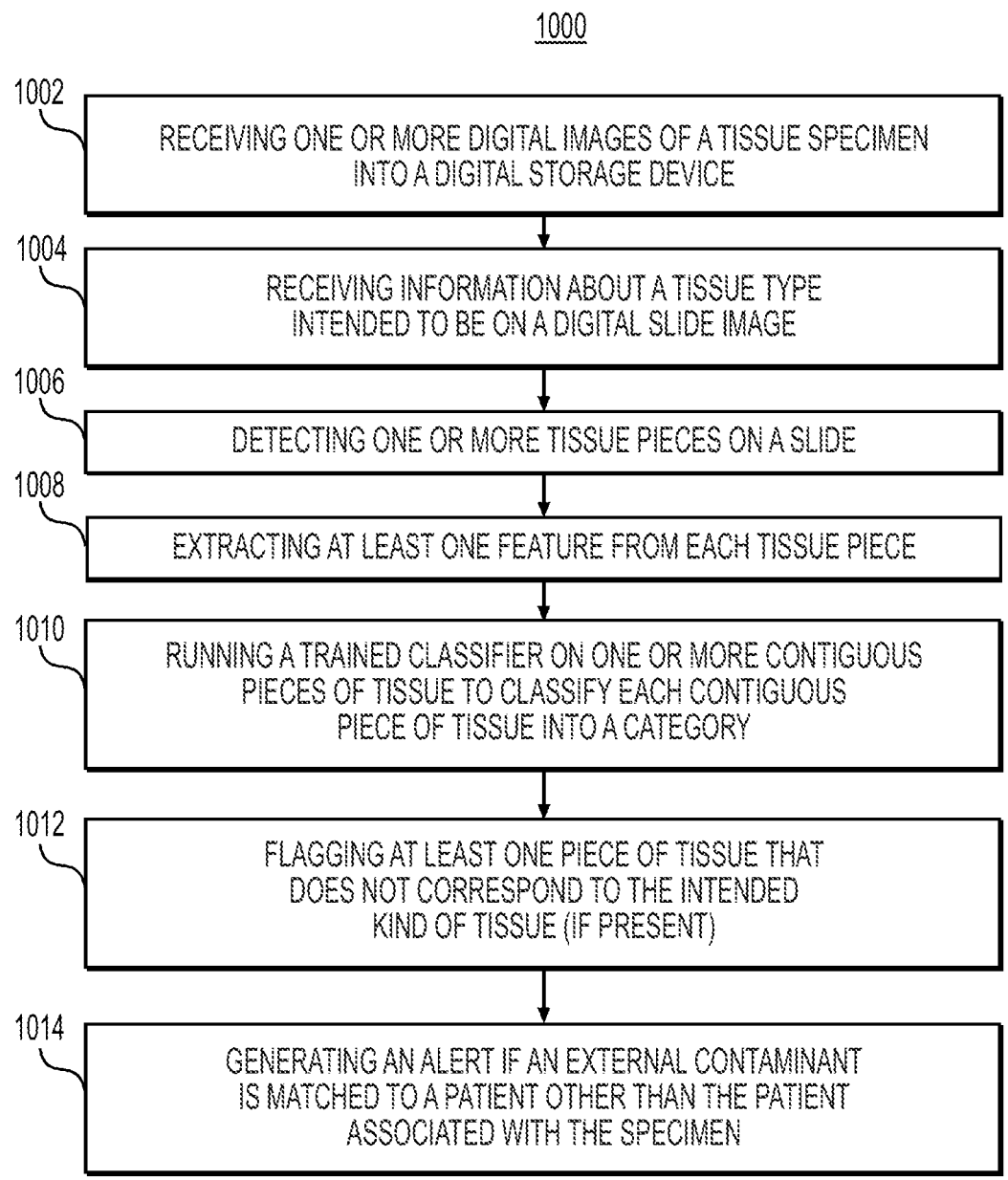
FIG. 10 is a flowchart illustrating an exemplary method of applying and using a trained classifier, according to an exemplary embodiment of the present disclosure.

FIG. 10 is a flowchart illustrating an exemplary method of applying a floater detection system with a machine learning system to compare tissue specimens. For example, exemplary method 900 may be performed by the slide analysis tool 101 in response to a request by a user (e.g., a physician).

In step 1002, the method may include receiving one or more digital images of a tissue specimen into a digital storage device. The digital storage device may comprise a hard drive, a network drive, cloud storage, RAM, or any other suitable storage device.

In step 1004, the method may include receiving information about a tissue type intended to be on a digital slide image. This information may be on a QR code associated with the digital slide image, may be received via LIS, manual entry or any other suitable means.

In step 1006, the method may include detecting one or more contiguous tissue pieces on a slide, based on received images of the slide and treating each contiguous tissue region as an independent sample of the pathology tissue specimen. Detection may be done in a variety of ways, including Otsu's method or some other thresholding-based scheme, followed by connected components to identify each piece of tissue; bounding box detection methods, including Faster R-CNN, Selective Search, EdgeBoxes, or DeepBox; semantic segmentation or instance segmentation methods, e.g., fully convolutional neural network, Mask R-CNN, U-Net, etc.

In step 1008, the method may include extracting at least one feature from each tissue piece. Features may include, but are not limited to, CNN features and/or embeddings, SIFT features, and/or SURF features.

In step 1010, the method may include running a machine learning system trained to classify a tissue type of each piece of contiguous tissue on at least one of the collection of digital images into a category.

In step 1012, the method may include flagging at least one piece of tissue that does not correspond to the intended kind of tissue, if present. Flagging may include a warning message, a box around a tissue that deviates from the intended kind of tissue, a segmentation of the tissue that deviates from the intended kind of tissue on the slide, or any other suitable form of flagging.

In step 1014, the method may include generating an alert if a tissue type is matched to a class other than the class associated with the tissue specimen. This alert may comprise a pop-up window on a display telling the user that an external contaminant is present, a marker displayed on the image indicating where the external contaminant is located. The method may additionally include outputting one or more regions with non-intended tissues, which are likely to comprise external contaminants, to an electronic storage. "Non-intended tissues" may comprise any tissue type designation that may be different from the received information about the intended tissue type.

Figure 11:
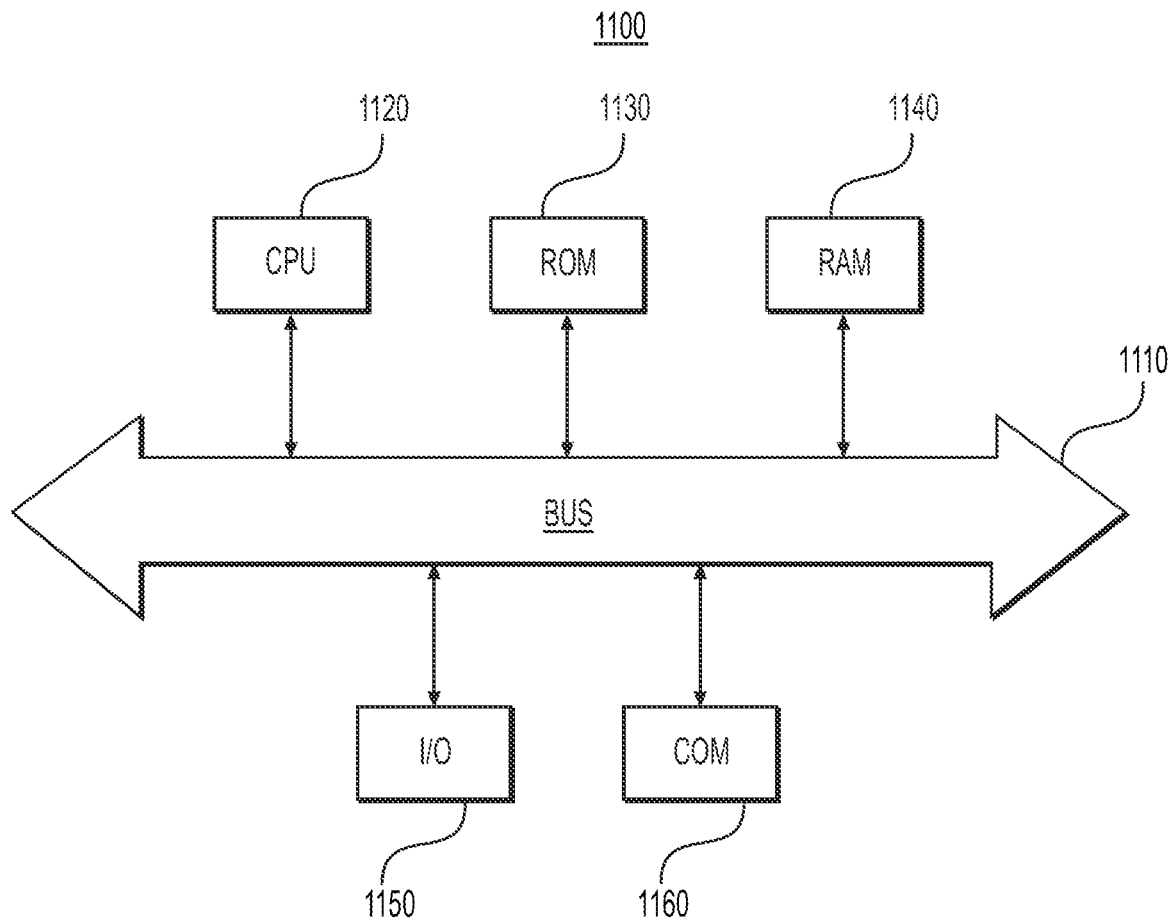
FIG. 11 illustrates an example system that may execute techniques presented herein.

As shown in FIG. 11, device 1100 may include a central processing unit (CPU) 1120. CPU 1120 may be any type of processor device including, for example, any type of special purpose or a general-purpose microprocessor device. As will be appreciated by persons skilled in the relevant art, CPU 1120 also may be a single processor in a multi-core/multi-processor system, such system operating alone, or in a cluster of computing devices operating in a cluster or server farm. CPU 1120 may be connected to a data communication infrastructure 1110, for example a bus, message queue, network, or multi-core message-passing scheme.

Device 1100 may also include a main memory 1140, for example, random access memory (RAM), and also may include a secondary memory 1130. Secondary memory 1130, e.g. a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1130 may include similar means for allowing computer programs or other instructions to be loaded into device 1100. Examples of such means may include a program cartridge and cartridge interface (such as that found in video game devices), a removable memory chip (such as an EPROM or PROM) and associated socket, and other removable storage units and interfaces, which allow software and data to be transferred from a removable storage unit to device 1100.

Device 1100 also may include a communications interface ("COM") 1160. Communications interface 1160 allows software and data to be transferred between device 1100 and external devices. Communications interface 1160 may include a modem, a network interface (such as an Ethernet card), a communications port, a PCMCIA slot and card, or the like. Software and data transferred via communications interface 1160 may be in the form of signals, which may be electronic, electromagnetic, optical or other signals capable of being received by communications interface 1160. These signals may be provided to communications interface 1160 via a communications path of device 1100, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Device 1100 may also include input and output ports 1150 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Throughout this disclosure, references to components or modules generally refer to items that logically can be grouped together to perform a function or group of related functions. Like reference numerals are generally intended to refer to the same or similar components. Components and modules may be implemented in software, hardware or a combination of software and hardware.

The tools, modules, and functions described above may be performed by one or more processors. "Storage" type media may include any or all of the tangible memory of the computers, processors, or the like, or associated modules thereof, such as various semiconductor memories, tape drives, disk drives and the like, which may provide non-transitory storage at any time for software programming.

Software may be communicated through the Internet, a cloud service provider, or other telecommunication networks. For example, communications may enable loading software from one computer or processor into another. As used herein, unless restricted to non-transitory, tangible "storage" media, terms such as computer or machine "readable medium" refer to any medium that participates in providing instructions to a processor for execution.

The foregoing general description is exemplary and explanatory only, and not restrictive of the disclosure. Other embodiments of the invention will be apparent to those skilled in the art from consideration of the specification and practice of the invention disclosed herein. It is intended that the specification and examples to be considered as exemplary only.

What is claimed is:

1. A computer-implemented method for processing an electronic image corresponding to a tissue specimen, the method comprising:
   receiving, from at least one of one or more physician servers, one or more hospital servers, one or more clinical trial servers, and one or more research lab servers, a plurality of digital images associated with a tissue specimen;
   detecting a plurality of image regions from a background of the digital images;
   extracting a plurality of features from the plurality of image regions;
   determining a prediction, using a machine learning system, of whether a first image region of the plurality of image regions is likely to comprise at least one external contaminant by comparing the plurality of features of the first image region of the image regions with the plurality of features of the other of the image regions, the machine learning system having been trained using a plurality of training images to predict a presence of external contaminants and/or a location of any external contaminants present in the tissue specimen; and
   determining, based on the prediction of whether the first image region comprises the at least one external contaminant, whether to process the first image region using a processing algorithm.

2. The computer implemented method of claim 1, wherein the prediction is determined based on at least one of a binary variable indicating an external contaminant is present, a numeric confidence score indicating presence of an external contaminant, a bounding box around a likely external contaminant and a confidence score for the bounding box, a segmentation mask for the external contaminant with a confidence score.

3. The computer implemented method of claim 1, wherein the detecting of the plurality of image regions from the background of the plurality of digital images comprises:
   thresholding based on color intensity, texture features, and/or Otsu's method.

4. The computer implemented method of claim 1, wherein the detecting of the plurality of image regions from the background of the plurality of digital images comprises using one or more segmentation algorithms.

5. The computer implemented method of claim 1, wherein the detecting of the plurality of image regions from the background of the plurality of digital images comprises using bounding box detection.

6. The computer implemented method of claim 1, further comprising:
   storing the plurality of digital images in at least one database along with a timestamp associated with the plurality of digital images.

7. The computer implemented method of claim 1, wherein the machine learning system is implemented by a convolutional neural network (CNN), Region CNN (R-CNN), Faster R-CNN, Mask R-CNN, Convolutional Graph Neural Network, and/or Relationship Neural Network.

8. The computer implemented method of claim 1, wherein the machine learning system is implemented by feature extraction using hand-engineered features and at least one of a random forest and deep learning, wherein the hand-engineered features comprise at least one from Scale-Invariant Feature Transform (SIFT), Speeded up robust features (SURF), Rotation Invariant Feature Transform (RIFT), Oriented feature from accelerated segment test (FAST) and/or Rotated Binary Robust Independent Elementary Features (BRIEF) (ORB).

9. The computer implemented method of claim 1, wherein the machine learning system is trained using by plurality of training images by:
   receiving the plurality of training images, wherein at least one of the plurality of training images includes at least one external contaminant and/or a background;
   receiving information about a localization of each external contaminant in at least one training image of the plurality of training images;
   receiving information about a tissue type of the tissue specimen depicted in at least one training image;
   detecting one or more image regions from the background of the training image; and
   training the machine learning system to indicate the presence of an external contaminant somewhere in the training image and/or a specific location of at least one external contaminant.

10. The computer implemented method of claim 1, further comprising:
    receiving information about a tissue type shown in the one or more digital images of the received one or more digital images; and
    determining the prediction at least in part based on the tissue type.

11. A system for processing an electronic image corresponding to a tissue specimen, the system comprising:
    at least one memory storing instructions; and
    at least one processor configured to execute the instructions to perform operations comprising:
    receiving from at least one of one or more physician servers, one or more hospital servers, one or more clinical trial servers, and one or more research lab servers, a plurality of digital images associated with a tissue specimen;
    detecting a plurality of image regions from a background of the digital images;
    extracting a plurality of features from the plurality of image regions;

determining a prediction, using a machine learning system, of whether a first image region of the plurality of image regions is likely to comprise at least one external contaminant by comparing the plurality of features of the first image region of the image regions with the plurality of features of the other of the image regions, the machine learning system having been trained using a plurality of training images to predict a presence of external contaminants and/or a location of any external contaminants present in the tissue specimen; and determining, based on the prediction of whether the first image region comprises the at least one external contaminant, whether to process the image region using a processing algorithm.

12. The system of claim 11, wherein a background of the one or more digital images comprises a portion of the image that is not the tissue specimen.

13. The system of claim 11, wherein the detecting of the plurality of image regions from a background of the plurality of digital images comprises:
thresholding based on color intensity, texture features, and/or Otsu's method.

14. The system of claim 11, wherein the detecting of the plurality of image regions from the background of the plurality of digital images comprises using one or more segmentation algorithms.

15. The system of claim 11, wherein the detecting of the plurality of image regions from the background of the plurality of digital images comprises using bounding box detection.

16. The system of claim 11, further comprising:
storing the plurality of digital images in at least one database along with a timestamp associated with the plurality of digital images.

17. The system of claim 11, wherein the machine learning system is trained using by plurality of training images by:
receiving a plurality of training images, wherein at least one of the training images includes at least one external contaminant and/or a background;
receiving information about a localization of each external contaminant in at least one training image of the plurality of training images;
receiving information about a tissue type of the tissue specimen depicted in at least one training image;
detecting one or more image regions from the background of the training image; and
training a machine learning system to indicate the presence of an external contaminant somewhere in the training image and/or a specific location of at least one external contaminant.

18. The system of claim 11, wherein the machine learning system is implemented by CNN, R-CNN, Faster R-CNN, Mask R-CNN, Convolutional Graph Neural Network, and/or Relationship Neural Network.

19. At least one non-transitory computer readable medium for processing an electronic image corresponding to a tissue specimen, the at least one non-transitory computer readable medium storing instructions which, when executed by one or more processors, cause the one or more processors to perform operations comprising:
receiving, from at least one of one or more physician servers, one or more hospital servers, one or more clinical trial servers, and one or more research lab servers, a plurality of digital images associated with a tissue specimen;
detecting a plurality of image regions from a background of the digital images;
extracting a plurality of features from the plurality of image regions;
determining a prediction, using a machine learning system, of whether a first image region of the plurality of image regions is likely to comprise at least one external contaminant by comparing the plurality of features of the first image region of the image regions with the plurality of features of the other of the image regions, the machine learning system having been trained using a plurality of training images to predict a presence of external contaminants and/or a location of any external contaminants present in the tissue specimen; and
determining, based on the prediction of whether the first image region comprises the at least one external contaminant, whether to process the first image region using a processing algorithm.

* * * * *